(12) United States Patent
Fujita et al.

(10) Patent No.: US 6,624,619 B2
(45) Date of Patent: Sep. 23, 2003

(54) STABILIZED POWER UNIT

(75) Inventors: Toshiyuki Fujita, Kitakatsuragi-gun (JP); Katsumi Inaba, Tondabayashi (JP); Tomohiro Suzuki, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/162,063

(22) Filed: Jun. 5, 2002

(65) Prior Publication Data

US 2003/0001552 A1 Jan. 2, 2003

(30) Foreign Application Priority Data

Jun. 5, 2001 (JP) ........................................ 2001-170037

(51) Int. Cl.[7] ................................................ G05F 1/40
(52) U.S. Cl. ........................................ 323/288; 323/901
(58) Field of Search ................................ 323/901, 283, 323/286, 288, 284

(56) References Cited

U.S. PATENT DOCUMENTS 3,959,714 A * 5/1976 Mihelich ..................... 323/288
4,806,842 A * 2/1989 Bittner ........................ 323/222

FOREIGN PATENT DOCUMENTS

JP        9-154275 A        6/1997

* cited by examiner

*Primary Examiner*—Shawn Riley
(74) *Attorney, Agent, or Firm*—Birch, Stewart, Kolasch & Birch, LLP

(57) ABSTRACT

A control section controls a switch to a charge period so as to charge a voltage-increasing capacitor at a start up. Then, the control section controls the switch to a voltage-increasing period so as to increase a voltage by a voltage-increasing capacitor and charges the output capacitor. The switching section alternately switches the charge period and the voltage-increasing period so that the charged voltage of the output capacitor, i.e., the output voltage is always stabilized within a range of the output voltage in a steady state. Here, a soft start circuit controls the switching section to carry out the switching operation so that the charged voltage always becomes not more than the output voltage in the steady state at the start-up.

23 Claims, 20 Drawing Sheets

STABILIZED POWER UNIT

FIELD OF THE INVENTION

The present invention relates to a switched-capacitor-type stabilized power unit.

BACKGROUND OF THE INVENTION

FIG. 19 shows a structure of a switched-capacitor-type stabilized power unit 101 for obtaining an output voltage twice as much as an input voltage. The stabilized power unit 101 is structured so as to include an integrated portion 101a, and a voltage-increasing capacitor C101, an input capacitor C102, an output capacitor C103, and voltage-dividing resistors R101 and R102 provided outside the integrated portion 101a. The integrated portion 101a is provided with switches S101, S102, S103, S104, a control section 111, a comparator 112, and a reference voltage source 113. Further, the integrated portion 101a is provided with an output terminal T101 outputting an output voltage $V_o$, an input terminal T102 to which an input voltage $V_{in}$ is inputted from a power source such as a battery, a feedback terminal T103 for the output voltage $V_o$, a GND terminal T104, a capacitor connection terminal T105 to which an electrode C− having a lower potential of the voltage-increasing capacitor C101 is connected, and a capacitor connection terminal T106 to which an electrode C+ having a higher potential of the voltage-increasing capacitor C101 is connected.

In the stabilized power unit 101, a switched capacitor section is structured by the switches S101, S102, S103, S104, and the voltage-increasing capacitor C101. The control section 111 controls switching operation of the switches S101, S102, S103, S104 in the switched capacitor section. When the control section 111 controls the switches S101 and S103 to be ON and the switches S102 and S104 to be OFF, and the input voltage $V_{in}$ is applied to the input terminal T102 via the input capacitor C102, the voltage-increasing capacitor C101 is charged. Next, when the control section 111 controls the switches S101 and S103 to be OFF and the switches S102 and S104 to be ON, the respective potentials of the electrodes of the voltage-increasing capacitor C101 increase by the potential of the input terminal T102. The voltage increased by such an operation is outputted as the output voltage $V_o$ via the output capacitor C103.

The output voltage $V_o$ is detected by the voltage-dividing resistors R101 and R102, and a voltage $V_{fb}101$ at a point connecting the voltage-dividing resistors R101 and R102 is inputted to a non-reversal input terminal of the comparator 112. The comparator 112 compares the voltage $V_{fb}101$ with a reference voltage $V_{ref}101$ generated by the reference power source 113 and inputted to a reversal input terminal. When the voltage $V_{fb}101$ reaches the reference voltage $V_{ref}101$, the comparator 112 outputs a signal to the control section 111 so as to stop the switching operation of the switches S101, S102, S103, S104. The comparator 112 is a comparator having a hysteresis function, and when the switching operation is stopped and the output voltage $V_o$ decreases, that is, the voltage $V_{fb}101$ decreases, the comparator 112 outputs a signal to the control section 111 so as to resume the switching operation of the switches S101, S102, S103, S104. By repeating the foregoing operation, the stabilized power unit 101 stabilizes the output voltage $V_o$.

FIG. 20 shows a time chart on the operation of stabilizing the output voltage $V_o$ in the stabilized power unit 101. At time $t_0$, the switches S101 and S103 are ON and the switches S102 and S104 are OFF, and the input voltage $V_{in}$ is started to be applied, the voltage-increasing capacitor C101 becomes charged, and the potential of the electrode C+ of the voltage-increasing capacitor C101 becomes $V_{in}$. Next, at time $t_1$, the switches S101 and S103 are OFF and the switches S102 and S104 are ON, and the potential of the electrode C+ of the voltage-increasing capacitor C101 becomes $2V_{in}$, a charge to the output capacitor C103 is started, and the output voltage $V_o$ comes to be increased. At time $t_2$, the respective switches are in the conditions identical to those at the time $t_0$, and the potential of the electrode C+ of the voltage-increasing capacitor C101 becomes $V_{in}$ again. At time $t_3$, the respective switches are in the conditions identical to those at the time $t_1$, and the potential of the electrode C+ of the voltage-increasing capacitor C101 becomes $2V_{in}$, and the output capacitor C103 becomes charged. In a period from the time $t_2$ to the time $t_3$, since an output current flows from the stabilized power unit 101 to a load, a discharge from the output capacitor C103 is carried out, and the output voltage $V_o$ is decreased.

The output voltage $V_o$ is increased by repeating such a charge and a discharge to and from the output capacitor C103 in a predetermined duty. When the output voltage $V_o$ reaches a predetermined threshold level COM1, that is, when the voltage $V_{fb}101$ at the point connecting the voltage-dividing resistors R101 and R102 reaches the reference voltage $V_{ref}101$, the comparator 112 outputs a signal for stopping the switching operation to the control section 111. Suppose that this occurs at time $t_k$, the switches S101 and S103 are ON and the switches S102 and S104 are OFF at the time $t_k$, and the condition is maintained. After the time $t_k$, the output voltage $V_o$ continues to be decreased until it declines to a predetermined threshold level COM2, where the comparator 112 outputs a signal for starting the switching operation to the control section 111. Suppose that this occurs at time $t_n$, the switches S101 and S103 are OFF and the switches S102 and S104 are ON at the time $t_n$, and the switching operation is started. In such a manner, the stabilized power unit 101 shifts from start-up state to steady state.

However, in the foregoing conventional stabilized power unit 101, when the output voltage $V_o$ increases very steeply, there is a possibility that the output voltage $V_o$ might overshoot and some load connected to the stabilized power unit 101 might fail to function properly.

SUMMARY OF THE INVENTION

It is therefore an object of the present invention to provide a switched-capacitor-type stabilized power unit which can prevent an overshoot of an output voltage at start-up, in a structure having an output capacitor which outputs a charged voltage obtained through a plurality of charges by switching operation utilizing a voltage-increasing potential of a voltage-increasing capacitor at the start-up, as the output voltage.

To achieve the foregoing object, a stabilized power unit of the present invention is a switched-capacitor-type stabilized power unit structured so as to include:

an voltage-increasing capacitor which is charged based on an input voltage and whose voltage is increased after being charged;

switching section for carrying out switching operation to alternately switch a charge period and a voltage-increasing period of the voltage-increasing capacitor; and an output capacitor which outputs a charged voltage obtained by being charged utilizing a voltage-increasing potential of the voltage-increasing capacitor in the voltage-increasing period, as an output voltage, and stabilizes the charged voltage within a range of the output voltage in steady state through a plurality of the voltage-increasing periods after a start-up is started, wherein the stabilized power unit includes soft start means for controlling the switching section to carry out the switching operation so that the charged voltage always becomes not more than the output voltage in the steady state, at the start-up from when the start-up is started until when the charged voltage is stabilized within the range of the output voltage in the steady state.

According to the foregoing invention, at the start-up, the soft start means controls the switching section to carry out the switching operation so that the charged voltage of the output capacitor always becomes not more than the output voltage in the steady state. With this structure, the charged voltage of the output capacitor becomes stabilized within the range of the output voltage in the steady state, without having an overshoot until the completion of the start-up. Consequently, it becomes possible to provide a switched-capacitor-type stabilized power unit which can prevent an overshoot of the output voltage at the start-up, in the structure having the output capacitor which outputs the charged voltage obtained through a plurality of charges by the switching operation utilizing a voltage-increasing potential of the voltage-increasing capacitor, as an output voltage.

Additional objects, features, and strengths of the present invention will be made clear by the description below. Further, the advantages of the present invention will be evident from the following explanation in reference to the drawings.

DESCRIPTION OF THE PREFERRED EMBODIMENTS

Referring to FIGS. 1 through 18, the following description will explain one embodiment of a stabilized power unit of the present invention.

Figure 1:
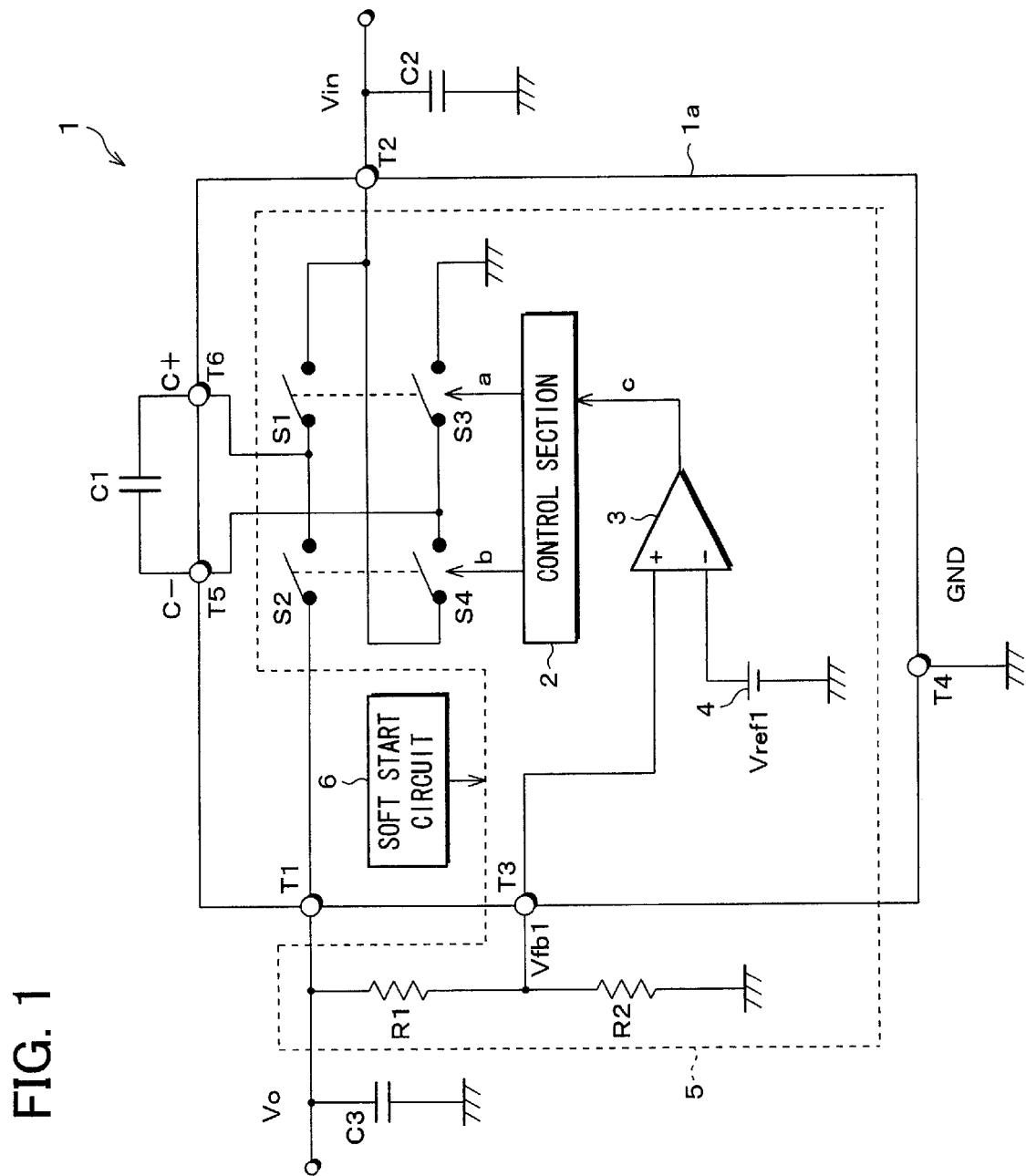
FIG. 1 is a block diagram showing a structure of a stabilized power unit in accordance with an embodiment of the present invention.

FIG. 1 shows a structure of a stabilized power unit 1 in accordance with the present embodiment. The stabilized power unit 1 is a switched-capacitor-type stabilized power unit, and is structured so as to include an integrated portion 1a, and a voltage-increasing capacitor C1, an input capacitor C2, an output capacitor C3, and voltage-dividing resistors R1 and R2 connected outside the integrated portion 1a.

The integrated portion 1a is provided with an output terminal T1 outputting an output voltage $V_o$ applied to a load, an input terminal T2 to which an input voltage $V_{in}$ is inputted from a power source, a feedback terminal T3 to which a detected value of the output voltage $V_o$ is inputted, a GND terminal T4, and a capacitor connection terminals T5 and T6 to which the voltage-increasing capacitor C1 is connected, all of which are lead pin terminals.

Outside the integrated portion 1a, an electrode C− having a lower potential of the voltage-increasing capacitor C1 is connected to the capacitor connection terminal T5, and an electrode C+ having a higher potential of the voltage-increasing capacitor C1 is connected to the capacitor connection terminal T6. The input capacitor C2 is connected between the input terminal T2 and a GND line. The output capacitor C3 is connected between the output terminal T1 and a GND line. The voltage-dividing resistors R1 and R2 are connected in series between the output terminal T1 and a GND line, with the voltage-dividing resistor R1 provided on the side of the output terminal T1. Besides, a connecting point between the voltage-dividing resistors R1 and R2 is connected to the feedback terminal T3. The GND terminal T4 is connected to a GND line outside the integrated portion 1a.

The voltage-increasing capacitor C1 is a capacitor which is charged in accordance with the input voltage $V_{in}$, and whose voltage is increased after the charge. The input capacitor C2 is a capacitor which is charged by a power source provided outside the stabilized power unit 1 and applies the input voltage $V_{in}$ to the input terminal T2. The output capacitor C3 is a capacitor outputting the output voltage $V_o$ obtained by a charge utilizing a voltage-increasing potential in the voltage-increasing capacitor C1, specifically, the output voltage $V_o$ obtained by the charge in accordance with a potential difference between the voltage-increasing potential at the electrode C+ and a GND potential in a structure in which the output capacitor C3 is connected in parallel with a circuit including the voltage-increasing capacitor C1 and the input capacitor C2 which are connected in series, via the output terminal T1. However, while the output capacitor C3 is being charged, the input voltage $V_{in}$ continues to be applied to the input capacitor C2. The voltage-dividing resistors R1 and R2 constitute a voltage-dividing circuit for the output voltage $V_o$, and the divided voltage of the output voltage $V_o$ at the connecting point between the voltage-dividing resistors R1 and R2, that is, the detected value, is inputted to the feedback terminal T3 as a feedback voltage $V_{fb}1$.

In the integrated portion 1a, on a path between the output terminal T1 and the input terminal T2, switches S1 and S2 for connecting or cutting off the path are provided in series, with the switch S2 provided on the side of the output terminal T1. Besides, on a path between the input terminal T2 and a GND line inside the integrated portion 1a, switches S3 and S4 for connecting or cutting off the path are provided in series, with the switch S4 provided on the side of the input terminal T2. Further, a connecting point between the switch S1 and the switch S2 is connected to the capacitor connection terminal T6, and a connecting point between the switch S3 and the switch S4 is connected to the capacitor connection terminal T5, respectively. A switched capacitor section is constituted by the switches S1, S2, S3, S4 and the capacitor C1.

In addition, a control section 2 is provided for controlling ON state (connected state) and OFF state (cut-off state) of the switches S1, S2, S3, S4. The control section 2 outputs a signal a which makes the switches S1 and S3 ON or OFF simultaneously, and outputs a signal b which makes the switches S2 and S4 ON or OFF simultaneously. With this arrangement, the switches S1, S2, S3, S4 carry out switching operation for switching the ON state and the OFF state.

The switching operation alternately switches a charge period in which the switches S1 and S3 are ON and the switches S2 and S4 are OFF, and the voltage-increasing capacitor C1 is charged by the application of the input voltage $V_{in}$, and a voltage-increasing period in which the switches S1 and S3 are OFF and the switches S2 and S4 are ON, and a voltage is increased in the voltage-increasing capacitor C1 and a charge from the voltage-increasing capacitor C1 to the output capacitor C3 is carried out. In the charge period, the voltage of the voltage-increasing capacitor C1 is determined by the input voltage $V_{in}$ and the length of the charge period. In the voltage-increasing period, the potential of the electrode C− of the voltage-increasing capacitor C1 increases from a GND potential to a potential of the input terminal T2, the potential of the electrode C+ increases by the potential increase at the electrode C−, and thus the voltage is increased. In the voltage-increasing period in steady state, the potential of the electrode C+ becomes $2V_{in}$. Consequently, the output capacitor C3 is charged in accordance with the application of the voltage $2V_{in}$. The output capacitor C3 outputs a charged voltage obtained by being charged by the voltage-increasing capacitor C1, as the output voltage $V_o$.

Further, a comparator 3 is provided so as to input a signal c for determining timing to start or stop the switching operation of the switches S1, S2, S3, S4, to the control section 2. A non-reversal input terminal of the comparator 3 is connected to the feedback terminal T3, and a reversal input terminal of the comparator 3 is connected to a DC voltage source 4 provided so as to generate and input a reference voltage $V_{ref}1$. The comparator 3 has a hysteresis function, and compares the feedback voltage $V_{fb}1$ inputted from the voltage-dividing resistors R1 and R2 to the non-reversal input terminal via the feedback terminal T3, with the reference voltage $V_{ref}1$ inputted to the reversal input terminal. When the feedback voltage $V_{fb}1$ reaches the reference voltage $V_{ref}1$, the comparator 3 outputs the signal c which gives an instruction to stop the switching operation of the switches S1, S2, S3, S4, to the control section 2. When the feedback voltage $V_{fb}1$ decreases by a predetermined value than the reference voltage $V_{ref}1$, the comparator 3 outputs the signal c which gives an instruction to start the switching operation of the switches S1, S2, S3, S4, to the control section 2. The foregoing predetermined value may be constant during the operation of the stabilized power unit 1, or may vary at the respective points.

Before the start-up of the stabilized power unit 1, the switches S1, S2, S3, S4 are all OFF under the control of the control section 2. When the start-up is started, the control section 2 controls so that the switches S1 and S3 become ON and the switches S2 and S4 become OFF, and the switching operation is started from the charge period. Then, by the switching operation of the switches S1, S2, S3, S4 after the start of the start-up, the charged voltage of the output capacitor C3 comes to be stabilized within a range of the output voltage $V_o$ in steady state after a plurality of the voltage-increasing periods, regardless of whether the switching operation is stopped by the comparator 3 or not. The switches S1, S2, S3, S4, the control section 2, the comparator 3, the DC voltage source 4, and the voltage-dividing resistors R1 and R2 constitute a switching section 5 as shown in FIG. 1, and the switching section 5 serves as switching means for carrying out the switching operation alternately switching the charge period and the voltage-increasing period of the voltage-increasing capacitor C1.

The integrated portion 1a is further provided with a soft start circuit 6. The soft start circuit 6 serves as soft start means for controlling the switching section 5 to carry out the switching operation so that, at the start-up from when the start-up is started until when the charged voltage of the output capacitor C3 is stabilized within the range of the output voltage $V_o$ in steady state, the charged voltage of the output capacitor C3 always becomes not more than the output voltage $V_o$.

Up to this point, the structure of the integrated portion 1a has been described.

Next, the following description will explain the operation of the stabilized power unit 1 of the foregoing structure. First, when the input voltage $V_{in}$ is inputted to the input terminal T2 via the input capacitor C2 and the start-up is started, the signal a outputted from the control section 2 makes the switches S1 and S3 ON, and the signal b outputted from the control section 2 makes the switches S2 and S4 OFF. With this arrangement, the charge period is started, and the voltage-increasing capacitor C1 becomes charged. Next, the signal a outputted from the control section 2 makes the switches S1 and S3 OFF, and the signal b outputted from the control section 2 makes the switches S2 and S4 ON, which switches the charge period to the voltage-increasing period in which the voltage is increased in the voltage-increasing capacitor C1, the output capacitor C3 becomes charged, and the output voltage $V_o$ is applied to the load. Afterwards, by alternately switching the charge period and the voltage-increasing period, the charged voltage of the output capacitor C3, that is, the output voltage $V_o$, becomes stabilized at the output voltage $V_o$ in steady state. Here, under the control by the soft start circuit 6, the switching section 5 carries out the switching operation at the start-up so that the charged voltage of the output capacitor C3 always becomes not more than the output voltage $V_o$ in steady state, so as to realize soft start.

Besides, after the start-up is started, the output voltage $V_o$ is detected by the voltage-dividing resistors R1 and R2, and the feedback voltage $V_{fb}1$ at the connecting point between the voltage-dividing resistors R1 and R2 is inputted as the detected value to the non-reversal input terminal of the comparator 3 via the feedback terminal T3. The comparator 3 compares the feedback voltage $V_{fb}1$ with the reference voltage $V_{ref}1$ of the DC voltage source 4. When the start-up is started, the feedback voltage $V_{fb}1$ is lower than the reference voltage $V_{ref}1$ by a predetermined value, and the comparator 3 outputs the signal c which gives an instruction to start the switching operation to the control section 2, and thus the switching section 5 carries out the switching operation. As the output voltage $V_o$ increases, the feedback voltage $V_{fb}1$ increases and reaches the reference voltage $V_{ref}1$, then the comparator 3 outputs the signal c which gives an instruction to stop the switching operation to the control section 2, and thus the switching section 5 stops the switching operation.

After the switching operation is stopped, the output voltage $V_o$ decreases due to power supply to the load, and when the feedback voltage $V_{fb}1$ becomes lower than the reference voltage $V_{ref}1$ by a predetermined value, the comparator 3 outputs the signal c which gives an instruction to start the switching operation to the control section 2, and the switching section 5 carries out the switching operation again. By repeating the foregoing process, the output voltage $V_o$ of the stabilized power unit 1 comes to be stabilized.

As described above, according to the stabilized power unit 1 in accordance with the present embodiment, since the soft start circuit 6 is provided, the charged voltage of the output capacitor C3 becomes stabilized within the range of the output voltage $V_o$ in steady state, without having an overshoot until the completion of the start-up. Consequently, the stabilized power unit 1 can prevent an overshoot of the output voltage $V_o$ at the start-up.

Next, the following examples will explain specific structures of the soft start circuit 6 in detail.

EXAMPLE 1

Figure 2:
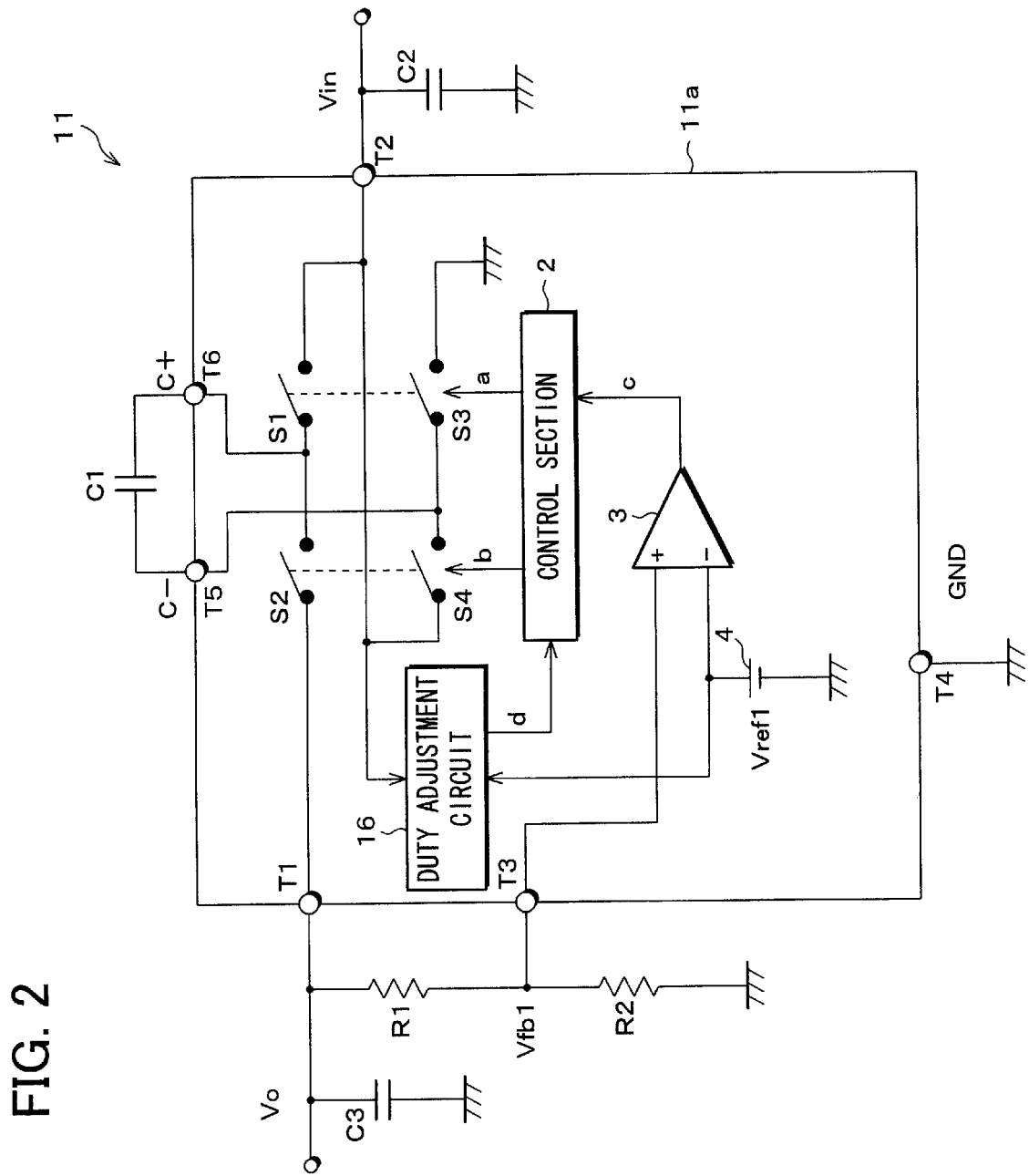
FIG. 2 is a circuit block diagram showing a more specific structure of the stabilized power unit shown in FIG. 1 in accordance with Example 1.

FIG. 2 shows a stabilized power unit 11 in which a duty adjustment circuit 16 is provided as the soft start circuit 6 shown in FIG. 1. Along with this, the integrated portion 1a in FIG. 1 is illustrated in FIG. 2 as an integrated portion 11a. The duty adjustment circuit 16 is operated by using the input voltage $V_{in}$ inputted from the input terminal T2 as a source voltage. Further, the reference voltage $V_{ref}1$ of the DC voltage source 4 is inputted to the duty adjustment circuit 16, and the duty adjustment circuit 16 outputs a control signal d to the control section 2, using the reference voltage $V_{ref}1$. The control section 2 controls the switches S1, S2, S3, S4 to carry out the switching operation so that there is a constant cycle between the start of a charge period and the start of the next charge period. When starting up the stabilized power unit 11, the duty adjustment circuit 16 makes the control section 2 gradually increase a duty in the charge period in the foregoing cycle, by the foregoing control signal d. Here, the duty is gradually increased to a predetermined value, that is, so that the charge period is gradually prolonged to a predetermined value, so as to prevent a rush current from flowing into the voltage-increasing capacitor C1 at the start-up. Since the rush current is prevented from flowing into the voltage-increasing capacitor C1, the output capacitor C3 is gradually charged in the voltage-increasing period. This structure can easily prevent an overshoot of the output voltage $V_o$ at the start-up.

Figure 3:
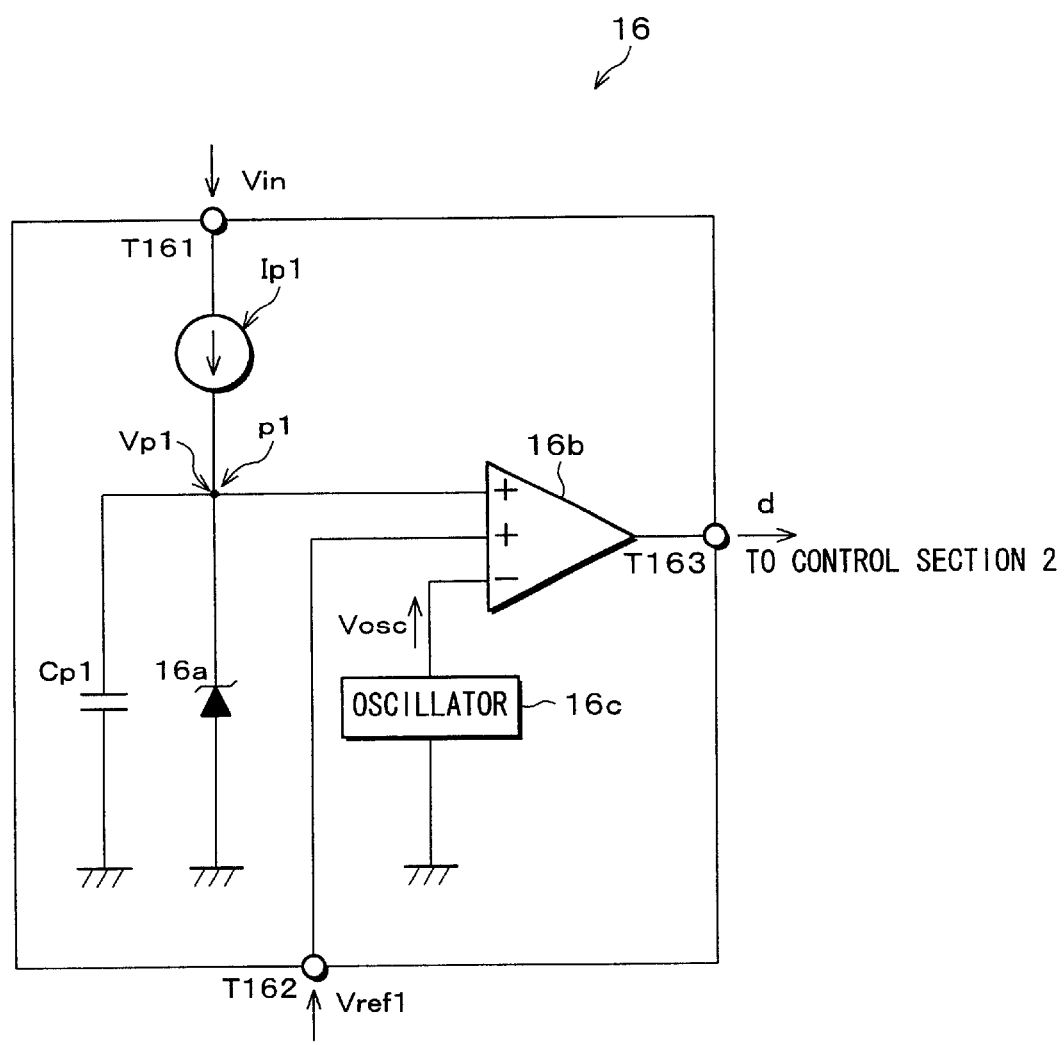
FIG. 3 is a circuit block diagram showing a structure of a duty adjustment circuit of the stabilized power unit shown in FIG. 2.

FIG. 3 shows a structure of the duty adjustment circuit 16. The duty adjustment circuit 16 in FIG. 3 is a circuit provided with a terminal T161 to which the input voltage $V_{in}$ is inputted via the input terminal T2, a terminal T162 to which the reference voltage $V_{ref}1$ of the DC voltage source 4 is inputted, and a terminal T163 from which the control signal d is outputted, and includes in its inside a constant current source $I_p1$, a capacitor $C_p1$, a Zener diode 16a, a PWM comparator 16b, and an oscillator 16c. Incidentally, it may be structured that a reference voltage $V_{ref}2$ (having the same value as the reference voltage $V_{ref}1$) generated by another DC voltage source is inputted to the terminal T162, instead of the reference voltage $V_{ref}1$.

The capacitor $C_p1$ and the Zener diode 16a are connected in parallel, and these are connected with the constant current source $I_p1$ in series. The constant current source $I_p1$ is connected between the terminal T161 and a point p1, and the capacitor $C_p1$ and the Zener diode 16a are connected between the point p1 and GND lines, with a cathode of the Zener diode 16a provided on the side of the point p1. The PWM comparator 16b has two non-reversal input terminals and one reversal input terminal. One of the non-reversal input terminals is connected to the point p1, the other non-reversal input terminal is connected to the terminal T162, and the reversal input terminal is connected to one end of the oscillator 16c. The other end of the oscillator 16c is connected to a GND line. Besides, an output terminal of the PWM comparator 16b is connected to the terminal T163.

Upon start of the start-up of the stabilized power unit 11, the constant current source $I_p1$ generates a constant current from the input voltage $V_{in}$ inputted from the terminal T161, and flows the constant current to the point p1. The capacitor $C_p1$ is charged by the flowing in of the constant current, and a charge amount is increased with time. When the charged voltage of the capacitor $C_p1$ reaches Zener voltage of the Zener diode 16a, the capacitor $C_p1$ is not charged any more, and the constant current flows via the Zener diode 16a. The Zener voltage is set higher than the reference voltage $V_{ref}1$. With this structure, a voltage $V_p1$ between the point p1 and a GND increases with time by the inclination of $I_p1/C_p1$, where $I_p1$ is the constant current and $C_p1$ is a capacity of the capacitor $C_p1$, and is inputted to one of the non-reversal input terminals of the PWM comparator 16b. When the stabilized power unit 11 is stopped, the constant current source $I_p1$ stops the generation of the constant current, the capacitor $C_p1$ gradually discharges via the Zener diode 16a, and the voltage $V_p1$ returns to an initial value (a GND potential). In this manner, the constant current source $I_p1$ and the Zener diode 16a constitute charge amount changing means for increasing the charge amount of the capacitor $C_p1$ with time at the start-up.

Figure 4:
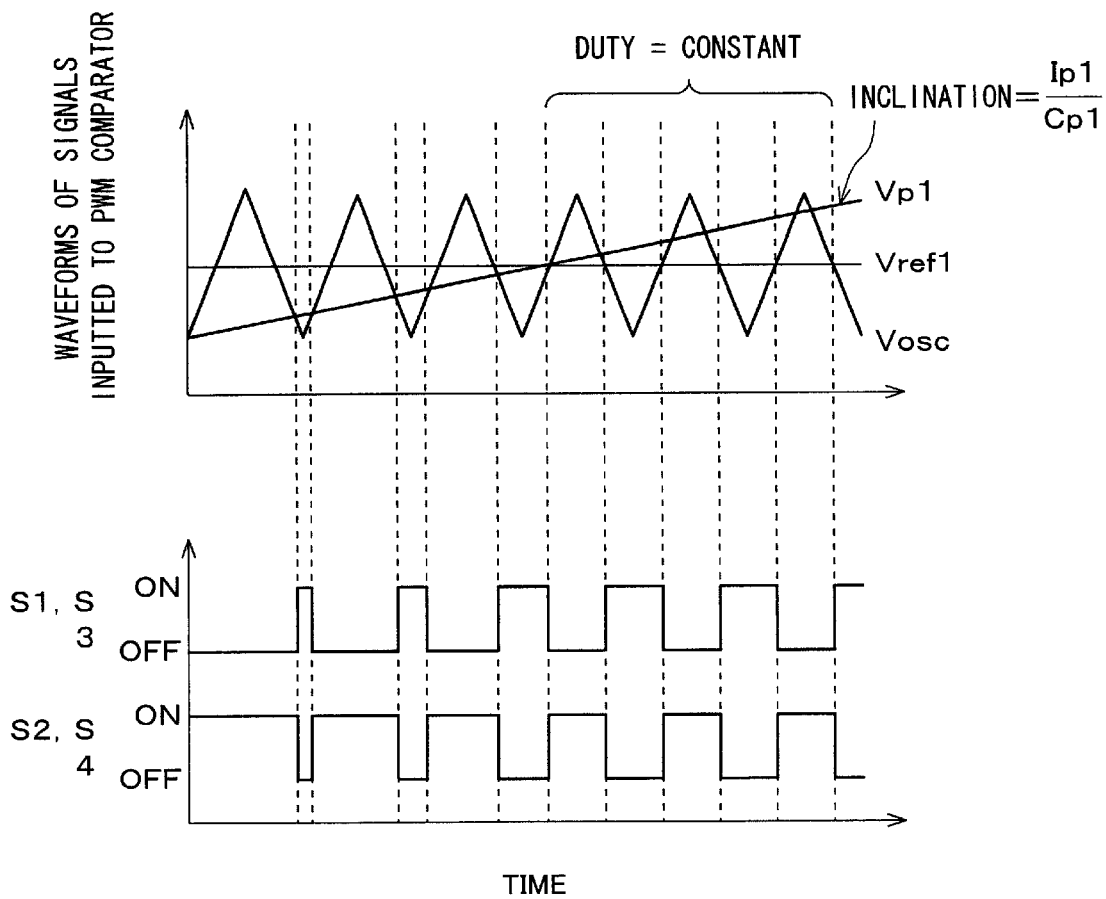
FIG. 4 is a time chart showing an operation of the stabilized power unit provided with the duty adjustment circuit shown in FIG. 3.

Besides, as shown in a time chart in FIG. 4, the oscillator 16c generates a triangular wave voltage $V_{osc}$ having a predetermined frequency, and the PWM comparator 16b outputs the control signal d which gives an instruction to set a period in which the lower voltage of the two voltages, the voltage $V_p1$ and the reference voltage $V_{ref}1$, is higher than the triangular wave voltage $V_{osc}$ as the charge period, and a period in which the lower voltage is lower than the triangular wave voltage $V_{osc}$ as the voltage-increasing period, to the control section 2. As shown in FIG. 4, when the voltage $V_p1$ is lower than the reference voltage $V_{ref}1$, the period in which the voltage $V_p1$ is higher than the triangular wave voltage $V_{osc}$ becomes longer with the increase of the voltage $V_p1$. Therefore, the charge period in which the switches S1 and S3 are ON and the switches S2 and S4 are OFF is gradually prolonged, and the foregoing duty is gradually increased. In other words, soft start can be realized. After the voltage $V_p1$ reaches the reference voltage $V_{ref}1$, the reference voltage $V_{ref}1$ becomes lower than the voltage $V_p1$, and the period in which the reference voltage $V_{ref}1$ is higher than the triangular wave voltage $V_{osc}$ is constant, therefore the charge period and the voltage-increasing period become constant. Consequently, by setting the point where the voltage $V_p1$ reaches the reference voltage $V_{ref}1$ to the point where the start-up is completed, the charge period becomes constant after the completion of the start-up, and the charge period (duty) in steady state can be obtained. In this manner, the PWM comparator 16b determines the charge period and the voltage-increasing period at the start-up and in steady state, in accordance with the charge amount of the capacitor $C_p1$.

Consequently, according to the stabilized power unit 11 provided with the duty adjustment circuit 16 structured as in FIG. 3, the duty adjustment circuit 16 determines the charge period at the star-up in accordance with the charge amount of the capacitor $C_p1$ increased with time by the charge amount changing means, and thus the duty adjustment circuit 16 can easily prevent a rush current from flowing into the voltage-increasing capacitor C1 at the start up. In addition, it is also possible to provide charge amount changing means for decreasing the charge amount of a capacitor with time at the start-up, instead of the constant current source $I_p1$ and the Zener diode 16a, and to determine the charge period in accordance with the charge amount of the capacitor whose charge amount is decreased with time by discharge. When using a PWM comparator, it is possible to set a period in which a voltage height relationship is opposite to the foregoing case, for example, in which the voltage of the capacitor is higher than the reference voltage and lower than the triangular wave voltage (it is satisfactory even when the voltage of the capacitor does not change linearly with respect to time), as the charge period at the start-up.

Besides, in the structure shown in FIG. 3, the less the increasing inclination of the voltage $V_p1$ is, the more slowly the duty increases, which can provide slower soft start. Since the voltage $V_p1$ is increased by $I_p1/C_p1 \times t$, where t denotes time since the capacitor $C_p1$ is started to be charged by the constant current, the charge period can be adjusted by adjusting the capacity of the capacitor $C_p1$. Such a capacitor $C_p1$ of a desired type may be externally attached to the integrated portion 11a, and thus it becomes possible to freely set how to change the charge period at the start-up.

In such a manner, the charge period is gradually prolonged with time by the duty adjustment circuit 16 shown in FIG. 3 so as to prevent a rush current from flowing into the voltage-increasing capacitor C1 at the start-up, and the duty adjustment circuit 16 controls the switching section 5 at the start-up to carry out the switching operation such that the charged voltage of the output capacitor C3 is always not more than the output voltage $V_o$ in steady state.

Figure 5:
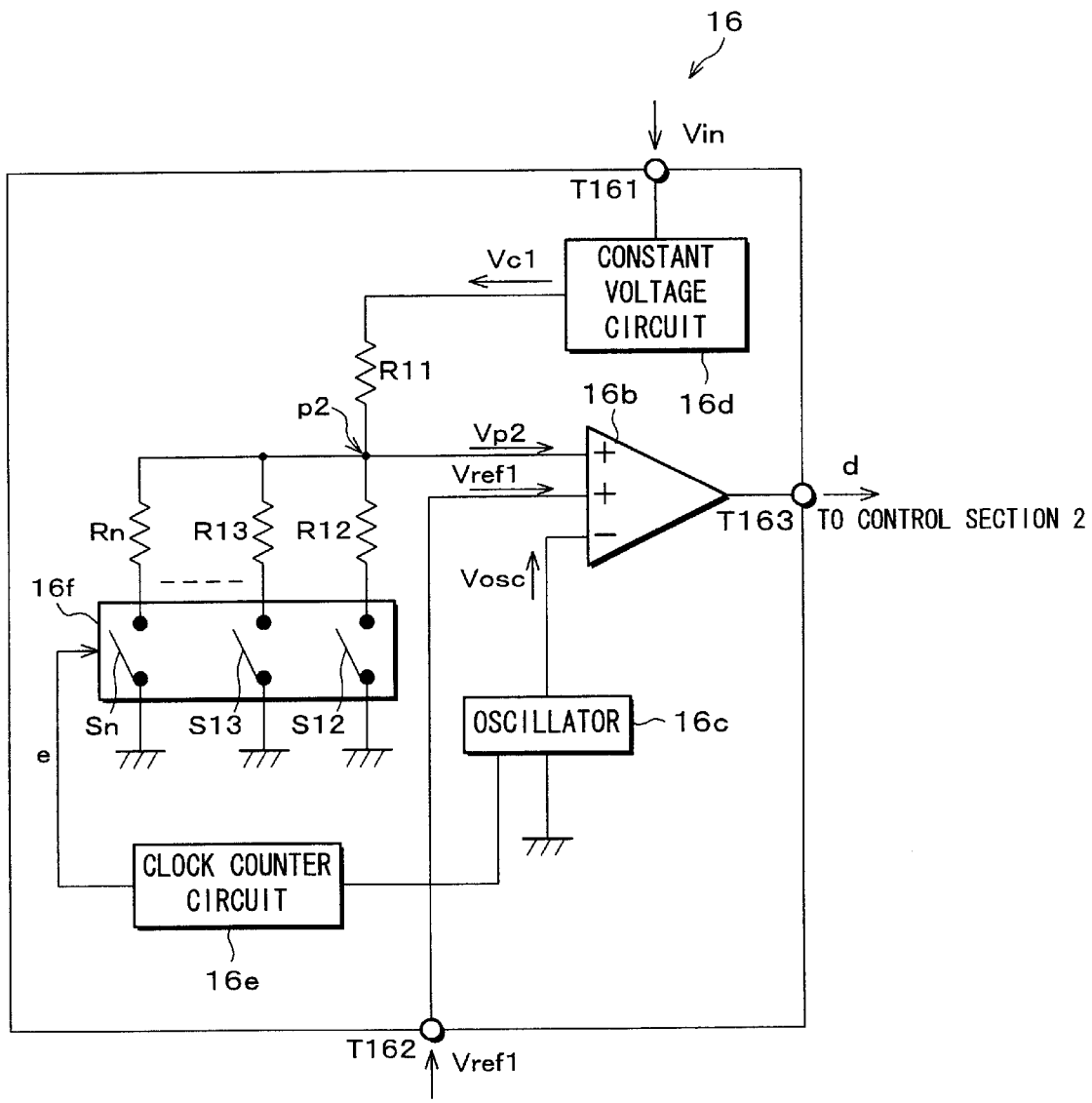
FIG. 5 is a circuit block diagram showing another structure of the duty adjustment circuit of the stabilized power unit shown in FIG. 2.

Next, FIG. 5 shows another structure of the duty adjustment circuit 16. The members having the same function as those in FIG. 3 will be designated by the same reference numerals. The duty adjustment circuit 16 in FIG. 5 is a circuit provided with the terminals T161, T162, and T163, as in the structure shown in FIG. 3, and includes in its inside resistors R11, R12, R13, . . . , Rn, the PWM comparator 16b, the oscillator 16c, a constant voltage circuit 16d, a clock counter circuit 16e, and a switch circuit 16f.

The switch circuit 16f is provided with switches S12, S13, . . . , Sn. The resistor R12 and the switch S12, the resistor R13 and the switch S13, . . . , and the resistor Rn and the switch Sn make pairs respectively, and the respective pairs are connected in parallel, with the resistor and the switch in each pair connected in series. The resistor side of this parallel circuit is connected with the resistor R11 in series at a point p2. The end of each switch opposite to the point connected with the paired resistor is connected with a GND line. The end of the resistor R11 opposite to the point p2 is connected to an output terminal of the constant voltage circuit 16d, and an input terminal of the constant voltage circuit 16d is connected to the terminal T161. The point p2 is connected to one of the non-reversal input terminals of the PWM comparator 16b. The other non-reversal input terminal of the PWM comparator 16b is connected to the terminal T162. An input terminal of the clock counter circuit 16e is connected to an output terminal of the oscillator 16c, and an output terminal of the clock counter circuit 16e is connected to a control terminal for switching ON/OFF the switch circuit 16f.

As described in the explanation of FIG. 3, the oscillator 16c oscillates the triangular wave voltage $V_{osc}$ at a predetermined frequency, and serves as oscillation means for carrying out oscillation at a predetermined oscillation frequency. The constant voltage circuit 16d generates constant voltage $V_c1$ from the input voltage $V_{in}$ for output. The clock counter circuit 16e counts the number of triangular waves generated by the oscillator 16c in a digital manner, and serves as counting means for carrying out counting for the oscillation means. Upon start of the start-up of the stabilized power unit 1, the clock counter circuit 16e starts counting the number of the triangular waves generated by the oscillator 16c, and when the number of oscillations reaches a predetermined value, the clock counter circuit 16e outputs a signal e giving an instruction which of the switches S12, S13, . . . , Sn should be ON (in connected state), to the switch circuit 16f. In other words, the clock counter circuit 16e detects the passage of time by counting the number of oscillations. The switch circuit 16f receives the signal e from the clock counter circuit 16e, and switches ON only the switch corresponding to the signal e among the switches S12, S13, . . . , Sn. A voltage $V_p2$ between the point p2 and a GND becomes a divided voltage of the constant voltage $V_c1$ determined by the resistor connected with the switch which becomes ON in series and the resistor R11, and is inputted to the PWM comparator 16b.

Figure 6:
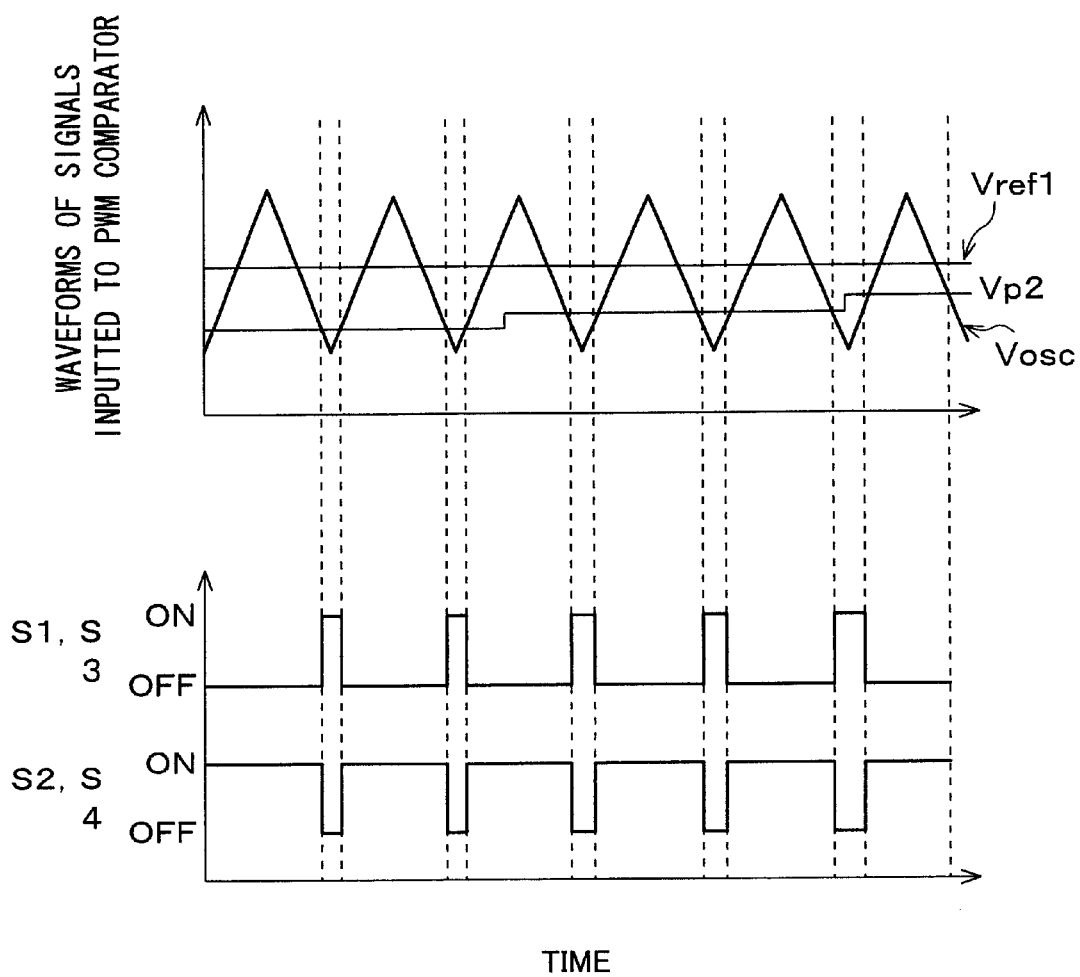
FIG. 6 is a time chart showing an operation of the stabilized power unit provided with the duty adjustment circuit shown in FIG. 5.

As shown in a time chart in FIG. 6, at the start-up, the switch circuit 16f switches ON a predetermined switch (for example, the switch S12) so that the voltage $V_p2$ becomes lowest. The clock counter circuit 16e counts the number of the triangular waves generated by the oscillator 16c, and outputs the signal e, by which the initial switch ON state can be maintained, to the switch circuit 16f until the count reaches the first threshold. When the count reaches the first threshold, the clock counter circuit 16e outputs the signal e, which switches ON only a switch (for example, switch S13) which makes the voltage $V_p2$ the second lowest, to the switch circuit 16f. In such a manner, the switches are switched for each threshold for the count, so as to increase the value of the voltage $V_p2$ step by step.

The PWM comparator 16b compares the voltage $V_p2$ with the reference voltage $V_{ref}1$, and outputs the signal d to the control section 2 so that the period in which the lower voltage of the two becomes higher than the triangular wave voltage $V_{osc}$ comes to be the charge period in which the switches S1 and S3 are ON and the switches S2 and S4 are OFF, and that the period in which the lower voltage of the two becomes lower than the triangular wave voltage $V_{osc}$ comes to be the voltage-increasing period in which the switches S1 and S3 are OFF and the switches S2 and S4 are ON. Since the voltage $V_p2$ is set lower than the reference voltage $V_{ref}1$ at the start-up, the charge period (duty) becomes longer with time. When the voltage $V_p2$ reaches the reference voltage $V_{ref}1$, the charge period and the voltage-increasing period become constant afterwards. In addition, the voltage $V_p2$ is set to be changed little by little by the switching operation of the switches in the switch circuit 16f, so that the charge period is gradually prolonged to the foregoing constant predetermined value so as to prevent a rush current from flowing into the voltage-increasing capacitor C1.

In this manner, according to the duty adjustment circuit 16 structured as shown in FIG. 5, the clock counter circuit 16e counts the number of oscillations of the oscillator 16c at the start-up so as to detect the passage of time, and the charge period is determined based on the detected passage of time. Therefore, it becomes possible to easily prevent a rush current from flowing into the voltage-increasing capacitor C1 at the start-up.

Thus, the charge period is gradually prolonged with time by the duty adjustment circuit 16 shown in FIG. 5 so as to prevent a rush current from flowing into the voltage-increasing capacitor C1 at the start-up, and the duty adjustment circuit 16 controls the switching section 5 at the start-up to carry out the switching operation such that the charged voltage of the output capacitor C3 is always not more than the output voltage $V_o$ in steady state.

EXAMPLE 2

Figure 7:
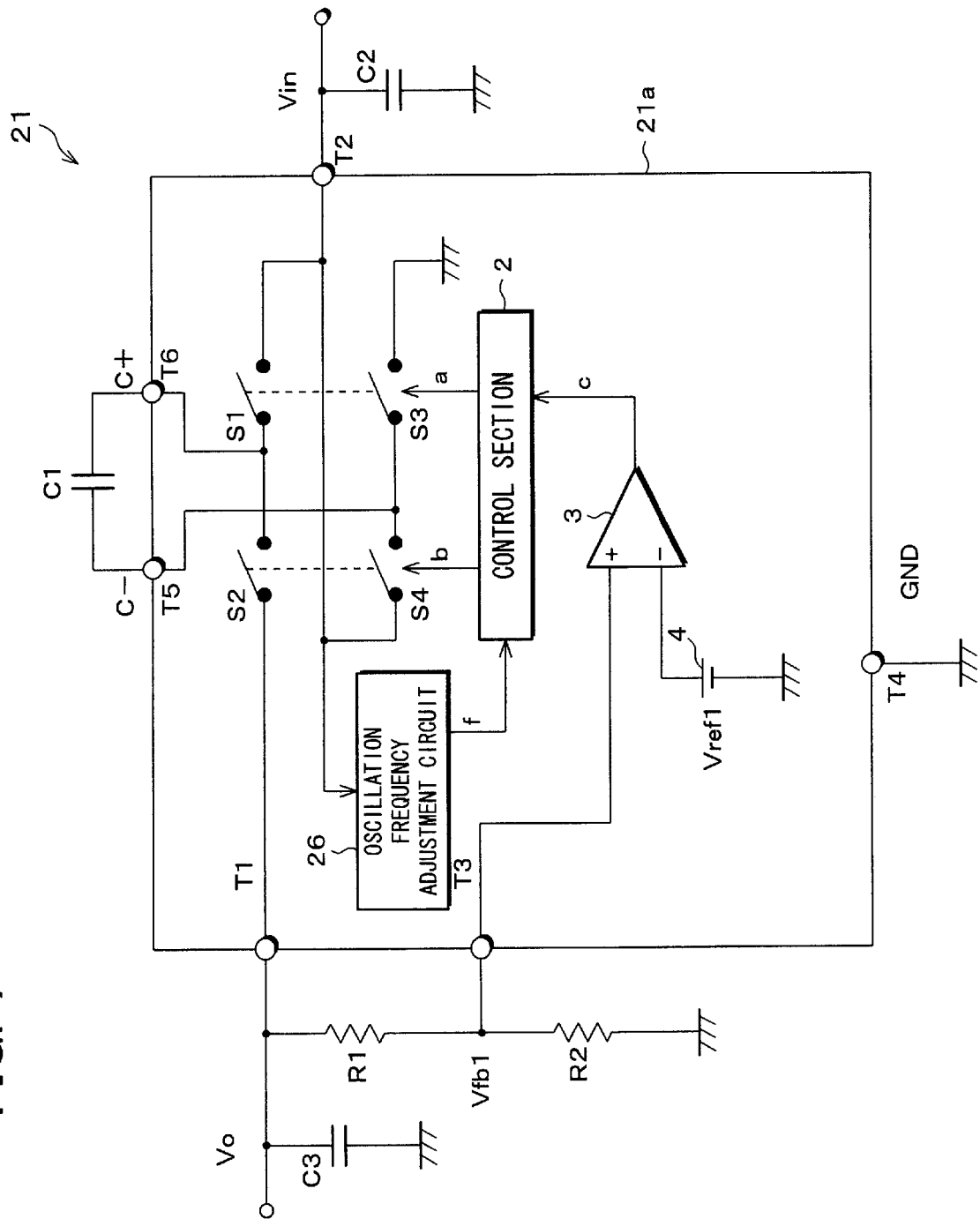
FIG. 7 is a circuit block diagram showing a more specific structure of the stabilized power unit shown in FIG. 1 in accordance with Example 2.

FIG. 7 shows a stabilized power unit 21 in which an oscillation frequency adjustment circuit 26 is provided as the soft start circuit 6 shown in FIG. 1. Along with this, the integrated portion 1a in FIG. 1 is illustrated in FIG. 7 as an integrated portion 21a. The oscillation frequency adjustment circuit 26 is operated by using the input voltage $V_{in}$ inputted from the input terminal T2 as a source voltage, and outputs a control signal f to the control section 2. At the start-up of the stabilized power unit 21, the oscillation frequency adjustment circuit 26 makes the control section 2 gradually prolong the charge period, by the foregoing control signal f. Besides, the charge period is increased so as to be gradually prolonged to a predetermined value in order to prevent a rush current from flowing into the voltage-increasing capacitor C1 at the start-up. Since the rush current is prevented from flowing into the voltage-increasing capacitor C1, the output capacitor C3 is gradually charged in the voltage-increasing period. This structure can easily prevent an overshoot of the output voltage $V_o$ at the start-up.

Figure 8:
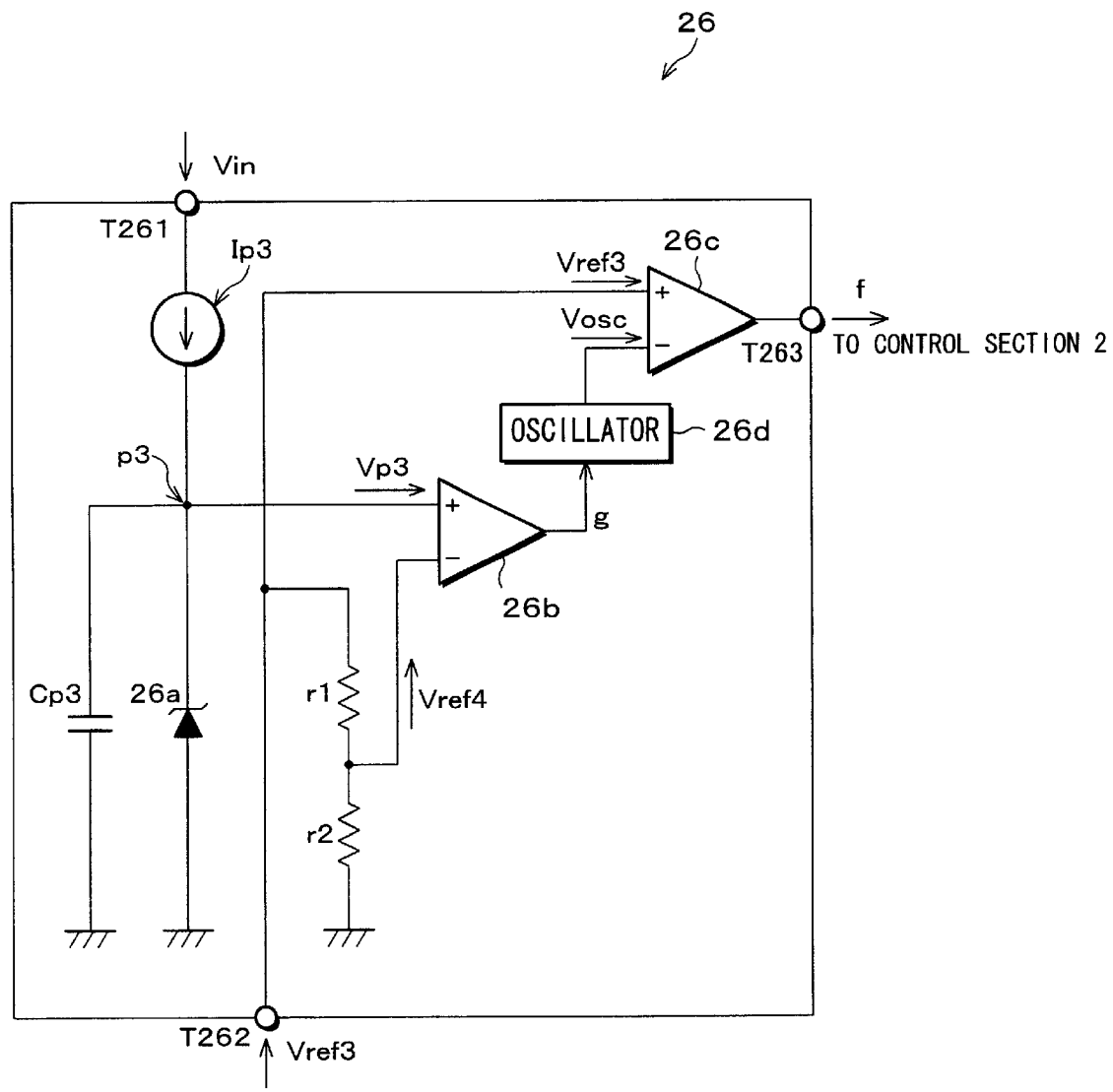
FIG. 8 is a circuit block diagram showing a structure of an oscillation frequency adjustment circuit of the stabilized power unit shown in FIG. 7.

FIG. 8 shows a structure of the oscillation frequency adjustment circuit 26. The oscillation frequency adjustment circuit 26 in FIG. 8 is a circuit provided with a terminal T261 to which the input voltage $V_{in}$ is inputted via the input terminal T2, a terminal T262 to which a reference voltage $V_{ref}3$ of a DC voltage source (not shown) provided together with the oscillation frequency adjustment circuit 26 is inputted, and a terminal T263 from which the control signal f is outputted, and includes a constant current source $I_p3$, a capacitor $C_p3$, resistors r1 and r2, a Zener diode 26a, comparators 26b and 26c, and an oscillator 26d.

The capacitor $C_p3$ and the Zener diode 26a are connected in parallel, and these are connected with the constant current source $I_p3$ in series. The constant current source $I_p3$ is connected between the terminal T261 and a point p3, and the capacitor $C_p3$ and the Zener diode 26a are connected between the point p3 and GND lines, with a cathode of the Zener diode 26a provided on the side of the point p3. The comparator 26b has one non-reversal input terminal and one reversal input terminal, and the non-reversal input terminal is connected to the point p3. The resistors r1 and r2 are connected in series between the terminal T262 and a GND line, with the resistor r2 provided on the side of the GND, and the reversal input terminal of the comparator 26b is connected to a connecting point between the resistors r1 and r2. Besides, an output terminal of the comparator 26b is connected to an input terminal of the oscillator 26d. The comparator 26c has one non-reversal input terminal and one reversal input terminal, and the non-reversal input terminal is connected to the terminal T262, and the reversal input terminal is connected to an output terminal of the oscillator 26d. An output terminal of the comparator 26c is connected to the terminal T263.

Upon start of the start-up of the stabilized power unit 21, the constant current source $I_p3$ generates a constant current from the input voltage $V_{in}$ inputted from the terminal T261, and flows the constant current to the point p3. The capacitor $C_p3$ is charged by the flowing in of the constant current, and its charge amount is increased with time. When the charged voltage of the capacitor $C_p3$ reaches Zener voltage of the Zener diode 26a, the capacitor $C_p3$ is not charged any more, and the constant current flows via the Zener diode 26a. The Zener voltage is set higher than a reference voltage $V_{ref}4$. With this structure, a voltage $V_p3$ between the point p3 and a GND increases with time, and is inputted to the non-reversal input terminal of the comparator 26b. When the stabilized power unit 21 is stopped, the constant current source $I_p3$ stops the generation of the constant current, the capacitor $C_p3$ gradually discharges via the Zener diode 26a, and the voltage $V_p3$ returns to an initial value (a GND potential).

To the reversal input terminal of the comparator 26b is inputted the reference voltage $V_{ref}4$ which is a divided voltage of the reference voltage $V_{ref}3$ generated by the resistors r1 and r2, and the comparator 26b compares the voltage $V_p3$ inputted to the non-reversal input terminal with the reference voltage $V_{ref}4$. The oscillator 26d is an oscillation-frequency-changeable oscillator for generating the triangular wave voltage $V_{osc}$, and the comparator 26b outputs a signal g for changing the oscillation frequency of the oscillator 26d to the oscillator 26d, based on the voltage height relationship between the voltage $V_p3$ and the reference voltage $V_{ref}4$. Here, at the start-up of the stabilized power unit 21, the comparator 26b outputs the signal g so as to make the oscillator 26d to carry out oscillation at the highest oscillation frequency during when the voltage $V_p3$ is lower than the reference voltage $V_{ref}4$, and so as to make the oscillator 26d to carry out oscillation at the second highest oscillation frequency when the voltage $V_p3$ increases and reaches the reference voltage $V_{ref}4$. By increasing the types of the signal g, the comparator 26b can switch oscillation frequencies of the oscillator 26d to lower ones one by one. In this manner, the constant current source $I_p3$, the capacitor $C_p3$, the resistors r1 and r2, the Zener diode 26a, the comparator 26b, and the oscillator 26d constitute oscillation means for carrying out oscillation with the oscillation frequency changed from high to low with time at the start-up. Besides, the constant current source $I_p3$ and the Zener diode 26a constitute charge amount changing means for increasing or decreasing the charge amount of the capacitor $C_p3$ with time at the start-up.

The comparator 26c compares the reference voltage $V_{ref}3$ inputted to the non-reversal input terminal with the triangular wave voltage $V_{osc}$ inputted to the reversal input terminal, and outputs the control signal f in accordance with the voltage height relationship between the two voltages. Here, as shown in a time chart in FIG. 9, when the reference voltage $V_{ref}3$ is higher than the triangular wave voltage $V_{osc}$, the comparator 26c outputs the control signal f which gives an instruction to set the period as the charge period in which the switches S1 and S3 are ON and the switches S2 and S4 are OFF, to the control section 2. On the other hand, when the reference voltage $V_{ref}3$ is lower than the triangular wave voltage $V_{osc}$, the comparator 26c outputs the control signal f which gives an instruction to set the period as the voltage-increasing period in which the switches S1 and S3 are OFF and the switches S2 and S4 are ON, to the control section 2.

Figure 9:
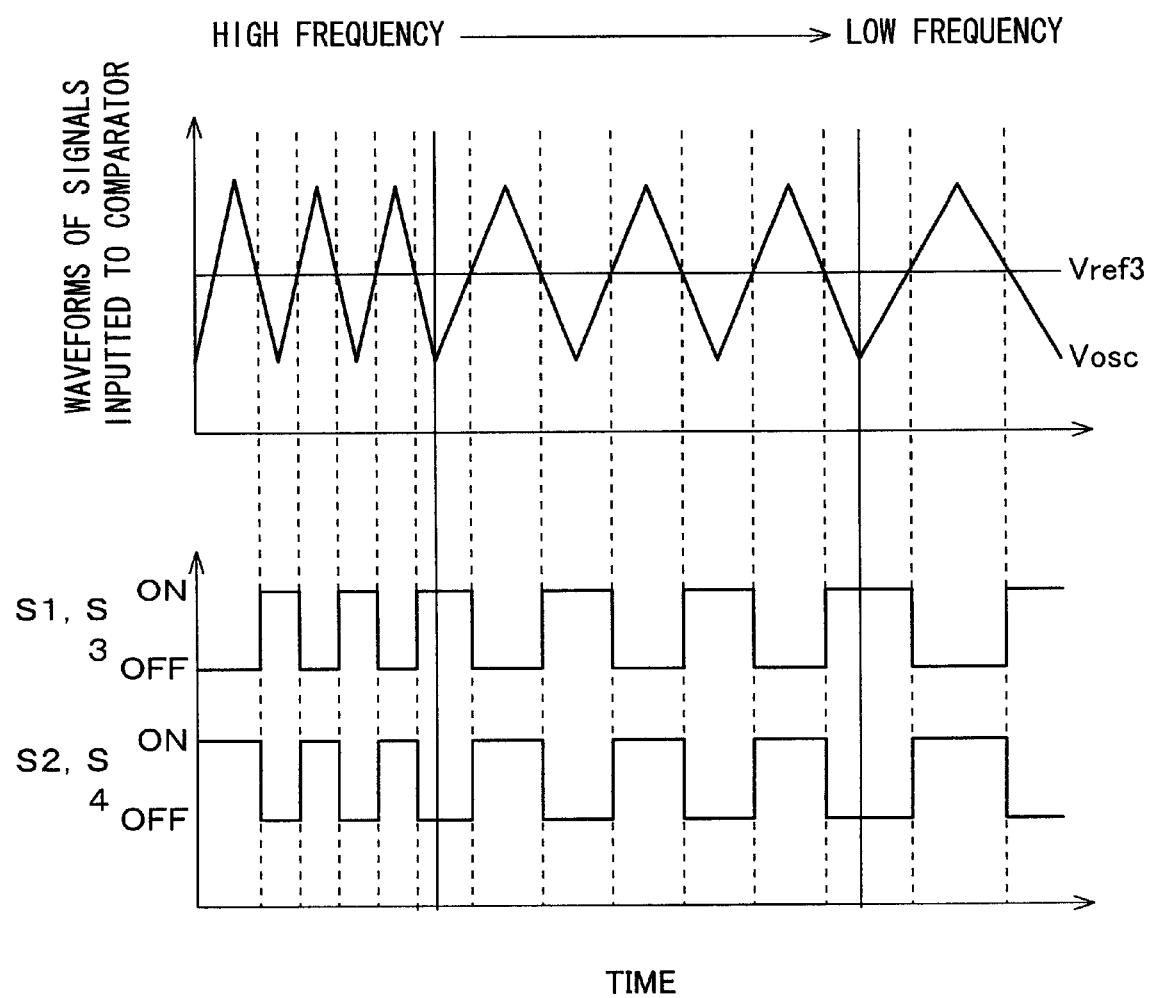
FIG. 9 is a time chart showing an operation of the stabilized power unit provided with the oscillation frequency adjustment circuit shown in FIG. 8.

As shown in FIG. 9, as the oscillation frequency of the oscillator 26d becomes lower in such a manner that, after the start of the start-up, the capacitor $C_p3$ is being charged, and when the voltage $V_p3$ reaches the reference voltage $V_{ref}4$, the frequency of the triangular wave voltage $V_{osc}$ becomes lower, the period in which the reference voltage $V_{ref}3$ is higher than the triangular wave voltage $V_{osc}$ is gradually prolonged, and thus the charge period is gradually prolonged. After the completion of the start-up, the oscillation frequency of the oscillator 26d becomes constant.

In this manner, the oscillation frequency adjustment circuit 26 structured as shown in FIG. 8 includes the above-mentioned oscillation means, and determines the charge period at the start-up based on the oscillation frequency. Since the charge period at the start-up is determined based on the oscillation frequency of the oscillation means which carries out oscillation with varying with time from a high frequency to a low frequency, it becomes possible to easily prevent a rush current from flowing into the voltage-increasing capacitor C1 at the start-up.

In addition, since the oscillation frequency of the oscillation means at the start-up is changed based on the charge amount of the capacitor $C_p3$ whose charge amount is increased with time by the charge amount changing means, it becomes possible to prevent a rush current from flowing into the voltage-increasing capacitor C1 at the start-up more easily. Incidentally, as in Example 1, it is possible to provide charge amount changing means for decreasing the charge amount of a capacitor with time at the start-up, instead of the constant current source $I_p3$ and the Zener diode 26a.

Besides, in the structure shown in FIG. 8, the less the increasing inclination of the voltage $V_p3$ is, the longer the interval of the timing that the oscillation frequency of the oscillator 26d switches from a high frequency to a low frequency is, which can provide slower soft start. Since the voltage $V_p3$ is increased by $I_p3/C_p3 \times t$, where t denotes time since the capacitor $C_p3$ is started to be charged by the constant current, the charge period can be adjusted by adjusting the capacity of the capacitor $C_p3$. Such a capacitor $C_p3$ of a desired type may be externally attached to the integrated portion 21a, and thus it becomes possible to freely set how to change the charge period at the start-up.

In such a manner, the charge period is gradually prolonged with time by the oscillation frequency adjustment circuit 26 shown in FIG. 8 so as to prevent a rush current from flowing into the voltage-increasing capacitor C1 at the start-up, and the oscillation frequency adjustment circuit 26 controls the switching section 5 at the start-up to carry out the switching operation such that the charged voltage of the output capacitor C3 is always not more than the output voltage $V_o$ in steady state.

Figure 10:
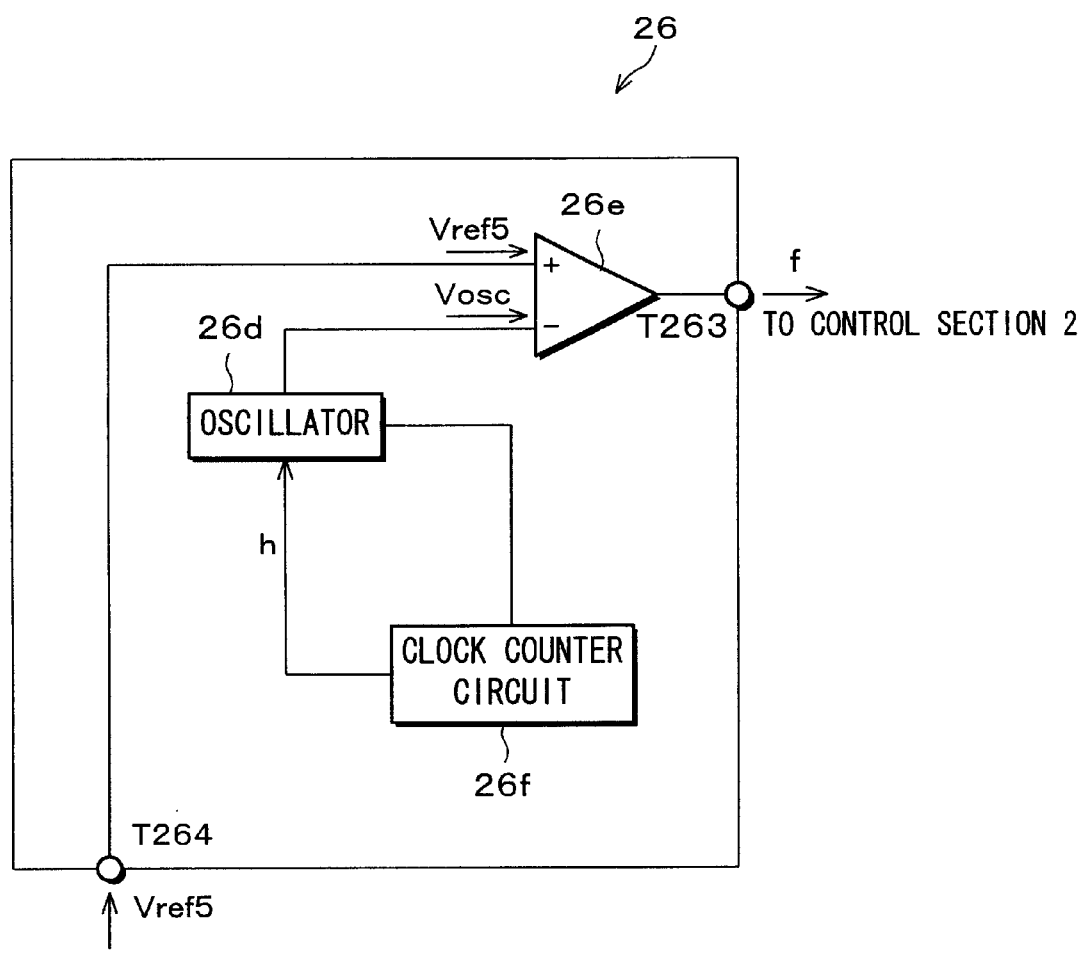
FIG. 10 is a circuit block diagram showing another structure of the oscillation frequency adjustment circuit of the stabilized power unit shown in FIG. 7.

Next, FIG. 10 shows another structure of the oscillation frequency adjustment circuit 26. The oscillation frequency adjustment circuit 26 in FIG. 10 is a circuit which is provided with the terminal T263 from which the control signal f is outputted, and a terminal T264 to which a reference voltage $V_{ref}5$ of a DC voltage source (not shown) provided together with the oscillation frequency adjustment circuit 26 is inputted, but which does not have a terminal to which the input voltage $V_{in}$ is inputted, and includes an oscillator 26d, a comparator 26e, and a clock counter circuit 26f. The comparator 26e has one non-reversal input terminal and one reversal input terminal: the non-reversal input terminal is connected to the terminal T264, and the reversal input terminal is connected to an output terminal of the oscillator 26d. An input terminal of the clock counter circuit 26f is connected to an output terminal of the oscillator 26d, and an output terminal of the clock counter circuit 26f is connected to an oscillation frequency control terminal of the oscillator 26d. An output terminal of the comparator 26e is connected to the terminal T263.

The comparator 26e compares the reference voltage $V_{ref}5$ inputted to the non-reversal input terminal with the triangular wave voltage $V_{osc}$ of the oscillator 26d inputted to the reversal input terminal, and outputs the control signal f in accordance with the voltage height relationship between the reference voltage $V_{ref}5$ and the triangular wave voltage $V_{osc}$. The control signal f is structured the same as the one used in the oscillation frequency adjustment circuit 26 shown in FIG. 8. The clock counter circuit 26f counts the number of oscillations of a triangular wave outputted from the oscillator 26d, and outputs a signal h for changing the oscillation frequency of the oscillator 26d from a high frequency to a low frequency, to the oscillator 26d, whenever the count reaches a predetermined threshold. Thus, soft start as shown in the time chart in FIG. 9 can be realized.

In this manner, the oscillator 26d and the clock counter circuit 26f constitute oscillation means for carrying out oscillation with the oscillation frequency changed from high to low with time at the start-up. Besides, the clock counter circuit 26f serves as counting means for counting the number of oscillations of the oscillation means. Since the oscillation frequency adjustment circuit 26 shown in FIG. 10 detects the passage of time by counting the number of oscillations of the oscillation means at the start-up by the counting means, and changes the oscillation frequency of the oscillation means based on the detected passage of time, it becomes possible to prevent a rush current from flowing into the voltage-increasing capacitor C1 at the start-up more easily.

In such a manner, the charge period is gradually prolonged with time by the oscillation frequency adjustment circuit 26 shown in FIG. 10 so as to prevent a rush current from flowing into the voltage-increasing capacitor C1 at the start-up, and the oscillation frequency adjustment circuit 26 controls the switching section 5 at the start-up to carry out the switching operation such that the charged voltage of the output capacitor C3 is always not more than the output voltage $V_o$ in steady state.

EXAMPLE 3

Figure 11:
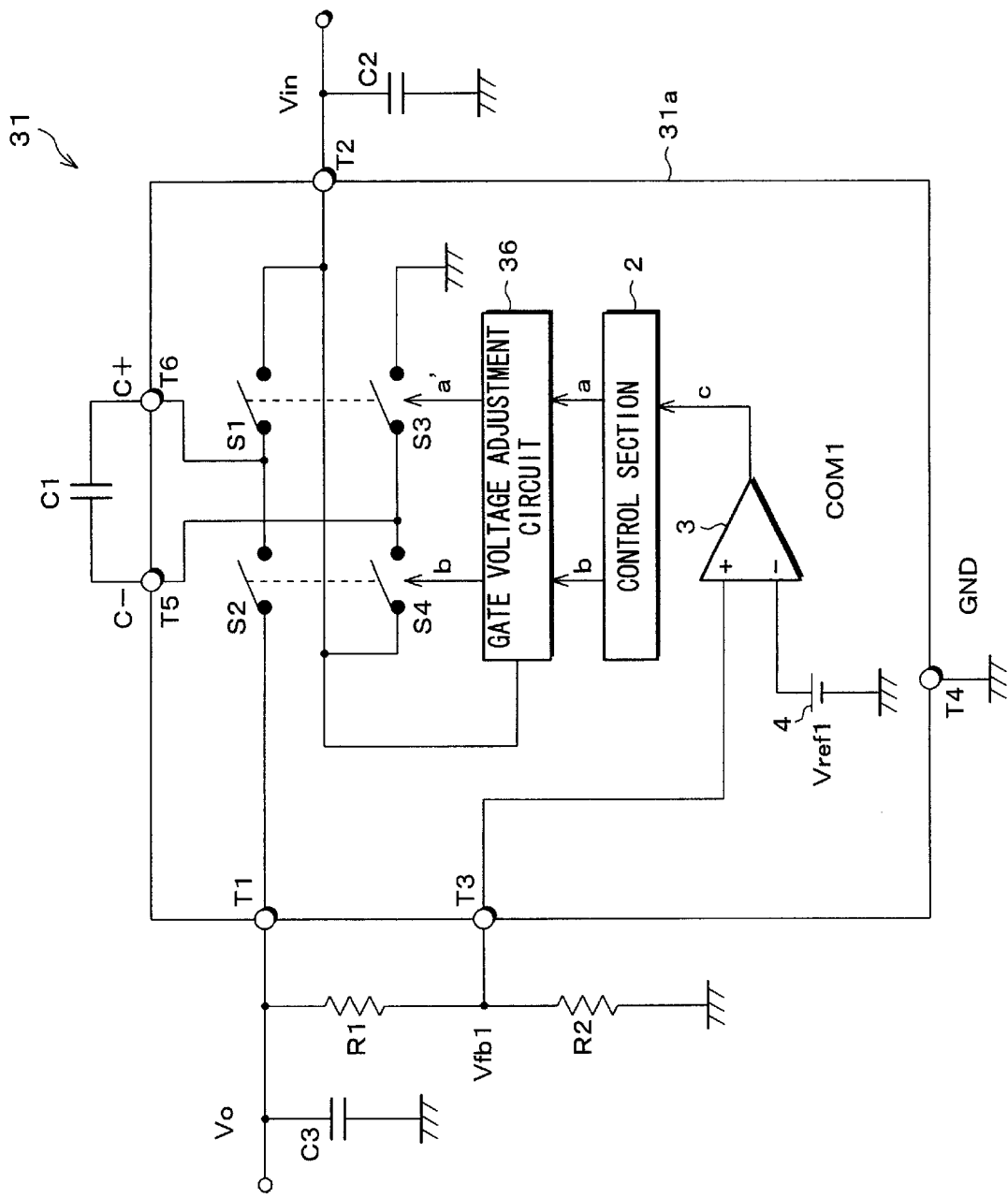
FIG. 11 is a circuit block diagram showing a more specific structure of the stabilized power unit shown in FIG. 1 in accordance with Example 3.

FIG. 11 shows a stabilized power unit 31 in which a gate voltage adjustment circuit 36 is provided as the soft start circuit 6 shown in FIG. 1. Along with this, the integrated portion 1a in FIG. 1 is illustrated in FIG. 11 as an integrated portion 31a. Besides, each of the switches S1 and S3 is a first switch for connecting a path for charging the voltage-increasing capacitor C1 in the charge period, and for cutting off the path for charging the voltage-increasing capacitor C1 in the voltage-increasing period, and at least one of the switches S1 and S3 is constituted by a field-effect transistor (hereinafter referred to as a MOSFET).

The gate voltage adjustment circuit 36 is operated by using the input voltage $V_{in}$ inputted from the input terminal T2 as a source voltage, and controls the switching section 5 (see FIG. 1) by adjusting the signal a outputted from the control section 2 for operating the MOSFET, that is, the signal for supplying a gate voltage for the MOSFET, so as to be a signal a'. More specifically, at the start-up, in order to prevent a rush current from flowing in the output capacitor C3 in the voltage-increasing period, a channel resistance when the MOSFET is conducting, here, in the charge period, is gradually decreased from a higher value by adjusting the gate voltage, so as to gradually increase a final charged voltage charged to the voltage-increasing capacitor C1 in the respective charge periods having an identical length, with the passage of time since the start of the start-up. Here, suppose that the signal b is not adjusted. In this manner, the gate voltage adjustment circuit 36 controls the switching section 5 to carry out the switching operation so as to exercise channel resistance control for decreasing the channel resistance with time when at least one MOSFET is conducting, for the purpose of preventing a rush current from flowing into the output capacitor C3 at the start-up.

Through the control of the gate voltage adjustment circuit 36 on the switching section 5, the output capacitor C3 is gradually charged at the start-up. Consequently, this structure can easily prevent an overshoot of the output voltage $V_o$ at the start-up. Besides, since no rush current flows, the current rating of the MOSFET can be set lower.

Incidentally, in the foregoing example, at least one of the switches S1 and S3 is defined as a MOSFET, but the present invention is not limited to this. Each of the switches S2 and S4 is a second switch for cutting off a path for charging the output capacitor C3 in the charge period, and for connecting the path for charging the output capacitor C3 in the voltage-increasing period, and it is satisfactory that at least one of the first switch and the second switch, or at least one of the switches S1, S2, S3, S4 in the present embodiment, is a MOSFET. The MOSFET provided as the second switch prevents a current flowing into the output capacitor C3 in each voltage-increasing period from becoming a rush current directly.

Figure 12:
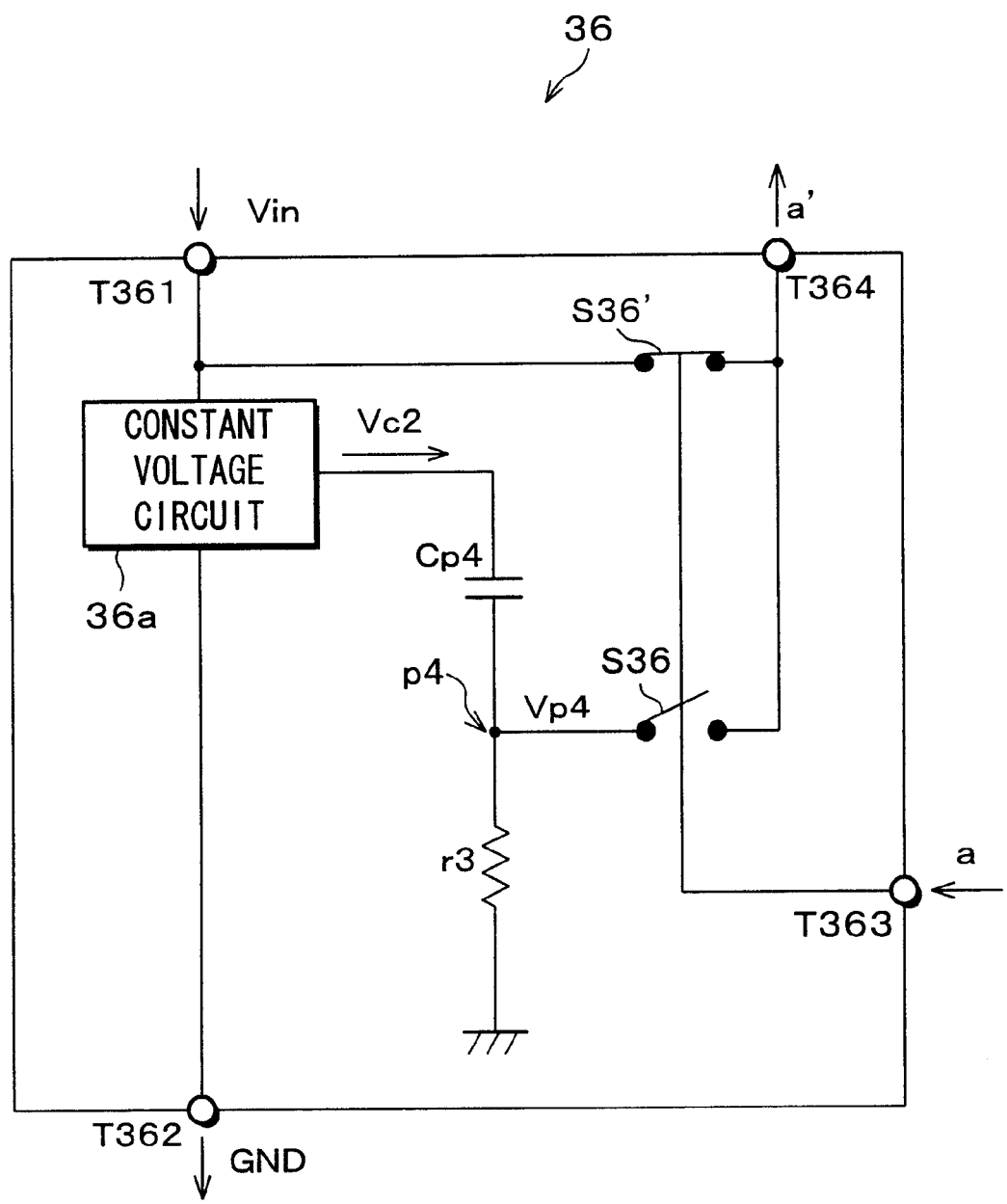
FIG. 12 is a circuit block diagram showing a structure of a gate voltage adjustment circuit of the stabilized power unit shown in FIG. 11.

FIG. 12 shows a structure of the gate voltage adjustment circuit 36. The gate voltage adjustment circuit 36 in FIG. 12 is structured for the switch S1 in FIG. 11. The gate voltage adjustment circuit 36 is a circuit provided with a terminal T361 to which the input voltage $V_{in}$ is inputted via the input terminal T2, a terminal T362 connected to a GND line, a terminal T363 to which the signal a is inputted from the control section 2, and a terminal T364 from which the signal a' is outputted, and includes a constant voltage circuit 36a, a capacitor $C_p4$, a resistor r3, and switching elements S36 and S36'. Besides, suppose that the switch S1 is a p-channel MOSFET.

The constant voltage circuit 36a are connected to the terminals T361 and T362 which serve as power terminals. Between an output terminal of the constant voltage circuit 36a and a GND line, the capacitor $C_p4$ and the resistor r3 are connected in series via a point p4, with the resistor r3 provided on the side of a GND. The switching element S36 is connected between the point 4 and the terminal T364, and a control terminal for switching ON and OFF the switching element S36 is connected to the terminal T363. The switching element S36' is connected between the terminal T361 and the terminal T364, and a control terminal for switching ON and OFF the switching element S36' is connected to the terminal T363. The switching element S36 is ON when the signal a inputted from the control section 2 via the terminal T363 is in a "LOW" level, and is OFF when the signal a is in a "HIGH" level. The switching element S36' is ON when the signal a is in a "HIGH" level, and is OFF when the signal a is in a "LOW" level.

Before the stabilized power unit 31 is started up, the switching element 36' is ON, and the MOSFET is OFF as a source and a gate of the MOSFET are short-circuited. Upon start of the start-up of the stabilized power unit 31, the constant voltage circuit 36a generates a constant voltage $V_c2$ from the input voltage $V_{in}$ for output. The capacitor $C_p4$ is gradually charged by the application of the constant voltage $V_c2$ to a circuit in which the capacitor $C_p4$ and the resistor r3 are connected in series. In the charge period, the signal a becomes "LOW", which makes the switching element S36 ON and thus the point p4 and the terminal T364 are short-circuited, and which makes the switching element S36' OFF and thus a short-circuit path between the terminal T361 and the terminal 364 is cut off. In the voltage-increasing period, the signal a becomes "HIGH", which makes the switching element S36 OFF and thus a short-circuit path between the point p4 and the terminal T364 is cut off. With this structure, in the charge period, signal a' having a voltage $V_p4$ between the point 4 and the terminal T364 is outputted from the terminal T364 to the switch S1, and a gate voltage within a range which makes the switch S1 ON is applied.

Figure 13:
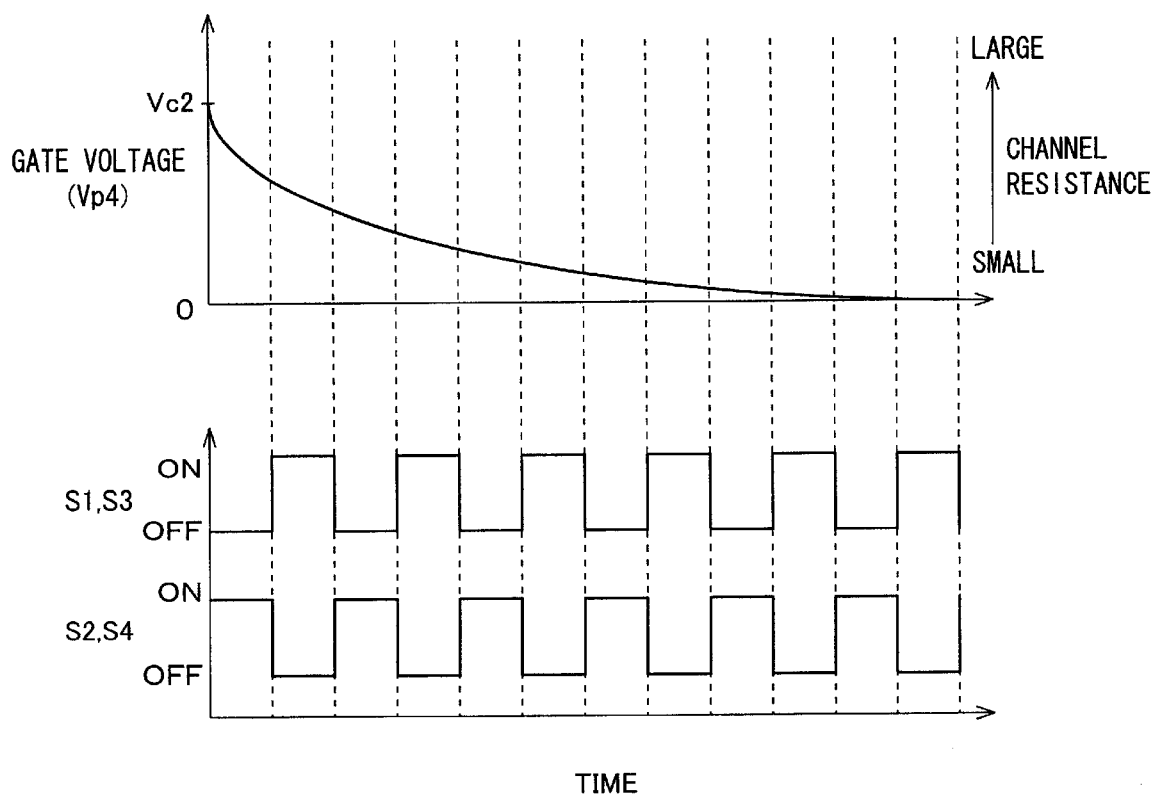
FIG. 13 is a time chart showing an operation of the stabilized power unit provided with the gate voltage adjustment circuit shown in FIG. 12.

As shown in a time chart in FIG. 13, the voltage $V_p4$ declines from the voltage $V_c2$ with a time constant determined by the capacitor $C_p4$ and the resistor r3. Therefore, even when predetermined, constant charge period and voltage-increasing period are repeated, the channel resistance of the MOSFET in the charge period decreases with time, and in steady state reached after a sufficient passage of time, the voltage $V_p4$ becomes virtually zero and the channel resistance is minimized. Consequently, in an initial stage of the start-up where the channel resistance is high, the voltage-increasing capacitor C1 is gradually charged in the charge period and the output capacitor C3 is also gradually charged, and as the channel resistance decreases, the charge amount in the charge period is increased, and the charged voltage of the output capacitor C3 is also increased. After the operation of the stabilized power unit 31 is stopped, the operation of the constant voltage circuit 36a is also stopped, and the accumulated charge in the capacitor $C_p4$ is discharged.

In this manner, the constant voltage circuit 36a and the resistor r3 constitute charge amount changing means for increasing the charge amount of the capacitor $C_p4$ with time at the start-up. The gate voltage adjustment circuit 36 decreases the channel resistance in a period for charging the MOSFET at the start-up, that is, in a period in which the MOSFET is conducting, based on the charge amount of the capacitor $C_p4$ which is increased with time at the start-up, and thus it can easily prevent a rush current from flowing into the output capacitor C3 at the start-up. In this manner, the channel resistance when the MOSFET is conducting is gradually decreased with time so as to prevent a rush current from flowing into the output capacitor C3 at the start-up, and the gate voltage adjustment circuit 36 controls the switching section 5 at the start-up to carry out the switching operation such that the charged voltage of the output capacitor C3 is always not more than the output voltage $V_o$ in steady state.

Such a capacitor $C_p4$ of a desired type may be externally attached, and thus it becomes possible to freely set how to decrease the channel resistance of the MOSFET in the charge period at the start-up. Incidentally, it is also possible to provide charge amount changing means for decreasing the charge amount of the capacitor $C_p4$ with time at the start-up, so as to decrease the channel resistance of the MOSFET in the charge period at the start-up based on the charge amount of the capacitor $C_p4$ which is increased with time.

Figure 14:
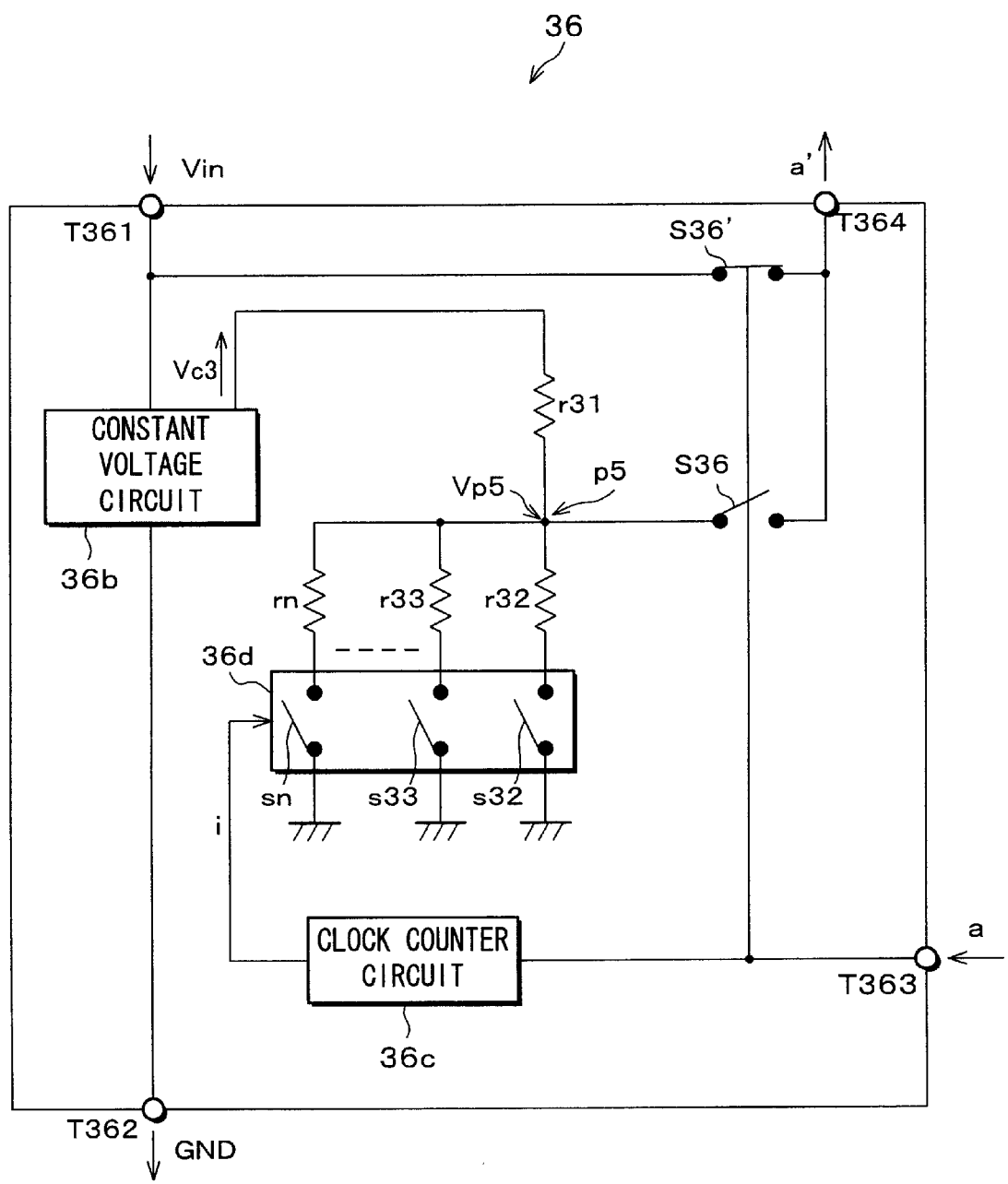
FIG. 14 is a circuit block diagram showing another structure of the gate voltage adjustment circuit of the stabilized power unit shown in FIG. 11.

Next, FIG. 14 shows another structure of the gate voltage adjustment circuit 36. The gate voltage adjustment circuit 36 in FIG. 14 is structured for the switch S1 in FIG. 11, and as in the gate voltage adjustment circuit 36 in FIG. 12, it is a circuit provided with the terminals T361 to T364, and includes a constant voltage circuit 36b, a clock counter circuit 36c, a switch circuit 36d, resistors r31, r32, r33, . . . , rn, and the switching elements S36 and S36'.

The constant voltage circuit 36b are connected to the terminals T361 and T362 which serve as power terminals. The switch circuit 36d includes switches s32, s33, . . . , sn. The resistor r32 and the switch s32, the resistor r33 and the switch s33, . . . , and the resistor rn and the switch sn make pairs respectively, and the respective pairs are connected in parallel, with the resistor and the switch in each pair connected in series. The resistor side of this parallel circuit is connected with the resistor r31 in series at a point p5. The resistance values of the resistors r32, r33, . . . , rn are set such that the resistor r32 has the greatest resistance value, the resistor r33 has the second greatest resistance value, and the resistance values of the resistors afterwards gradually decrease, whereas the resistance value of the resistor rn is zero. The end of each switch opposite to the point connected with the paired resistor is connected with a GND line. The end of the resistor r31 opposite to the point p5 is connected to an output terminal of the constant voltage circuit 36b. An input terminal of the clock counter circuit 36c is connected to the terminal T363, and an output terminal of the clock counter circuit 36c is connected to a control terminal for switching ON/OFF the switch circuit 36d. The switching element S36 is connected between the point p5 and the terminal T364, and a control terminal for switching ON/OFF the switching element S36 is connected to the terminal T363. The switching element S36' is connected in the same way as in FIG. 12.

Before the stabilized power unit 31 is started up, the switching element 36' is ON, and the MOSFET is OFF as a source and a gate of the MOSFET are short-circuited. Upon start of the start-up of the stabilized power unit 31, the constant voltage circuit 36b generates a constant voltage $V_c3$ from the input voltage $V_{in}$ for output. The signal a inputted from the terminal T363 after the start-up of the stabilized power unit 31 is started is originally a switching signal constituted by a pulse corresponding to the switching operation, together with the signal b. The clock counter circuit 36c counts the number of pulses of the signal a, and whenever the count reaches a predetermined threshold, the clock counter circuit 36c outputs a signal i which gives an instruction to switch ON (close) only one switch corresponding to each threshold, to the switch circuit 36d. With this structure, a voltage $V_p5$ is generated by dividing the voltage $V_c3$, at the point p5. In the charge period, the signal a becomes "LOW", which makes the switching element S36 ON (connected state) and the switching element S36' OFF (cut-off state), and the voltage $V_p5$ is outputted from the terminal T364 as a voltage of the signal a', that is, the gate voltage of the MOSFET. On the other hand, in the voltage-increasing period, the signal a becomes "HIGH", which makes the switching element S36 OFF and the switching element S36' ON, and the MOSFET becomes OFF with the source and the gate short-circuited.

Figure 15:
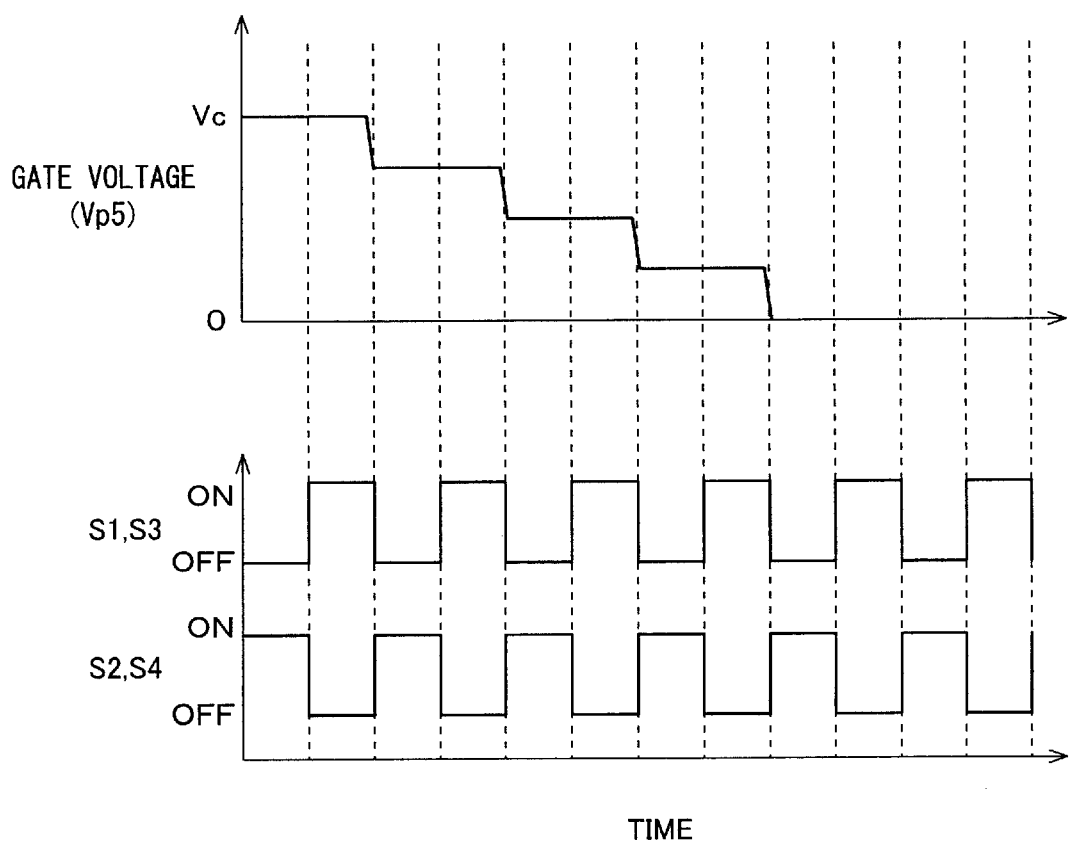
FIG. 15 is a time chart showing an operation of the stabilized power unit provided with the gate voltage adjustment circuit shown in FIG. 14.

As shown in a time chart in shown FIG. 15, when the start-up of the stabilized power unit 31 is started, the switch s32 of the switch circuit S36d is ON so that the voltage $V_p5$ has the greatest value $V_c$, and whenever the count of the number of pulses of the signal a counted by the clock counter circuit 36c reaches a threshold (for each increment in FIG. 15), the switch in the switch circuit 36d is switched in order of s32→s33→ . . . →sn, and the voltage $V_p5$ is reduced step by step. At the completion of the start-up, the switch sn is closed and the voltage $V_p5$ becomes zero. Consequently, in order to prevent a rush current from flowing into the output capacitor C3, the channel resistance of the MOSFET is decreased with time in the charge period, and the output capacitor C3 is gradually charged in the voltage-increasing period.

In this manner, the control section 2 serves as switching signal generation means for generating the switching signal, and the clock counter circuit 36c serves as counting means for counting the number of pulses of the switching signal generated by the switching signal generation means. Since the gate voltage adjustment circuit 36 detects the passage of time at the start-up by counting the number of pulses of the signal a by means of the clock counter circuit 36c, and reduces the channel resistance when the MOSFET is conducting based on the detected passage of time, it becomes possible to easily prevent a rush current from flowing into the output capacitor C3 at the start-up. In such a manner, the channel resistance when the MOSFET is conducting is gradually reduced with time so as to prevent a rush current from flowing into the output capacitor C3 at the start-up, and the gate voltage adjustment circuit 36 controls the switching section 5 at the start-up to carry out the switching operation such that the charged voltage of the output capacitor C3 is always not more than the output voltage $V_o$ in steady state. Incidentally, in FIGS. 12 and 14, it is satisfactory that the signal a is a signal generated corresponding to the switching operation of the switch S1, and its HIGH/LOW level may be reversed compared with the foregoing example as long as the ON/OFF relationship of the switches S36 and S36' is the same as in the foregoing example.

EXAMPLE 4

Figure 16:
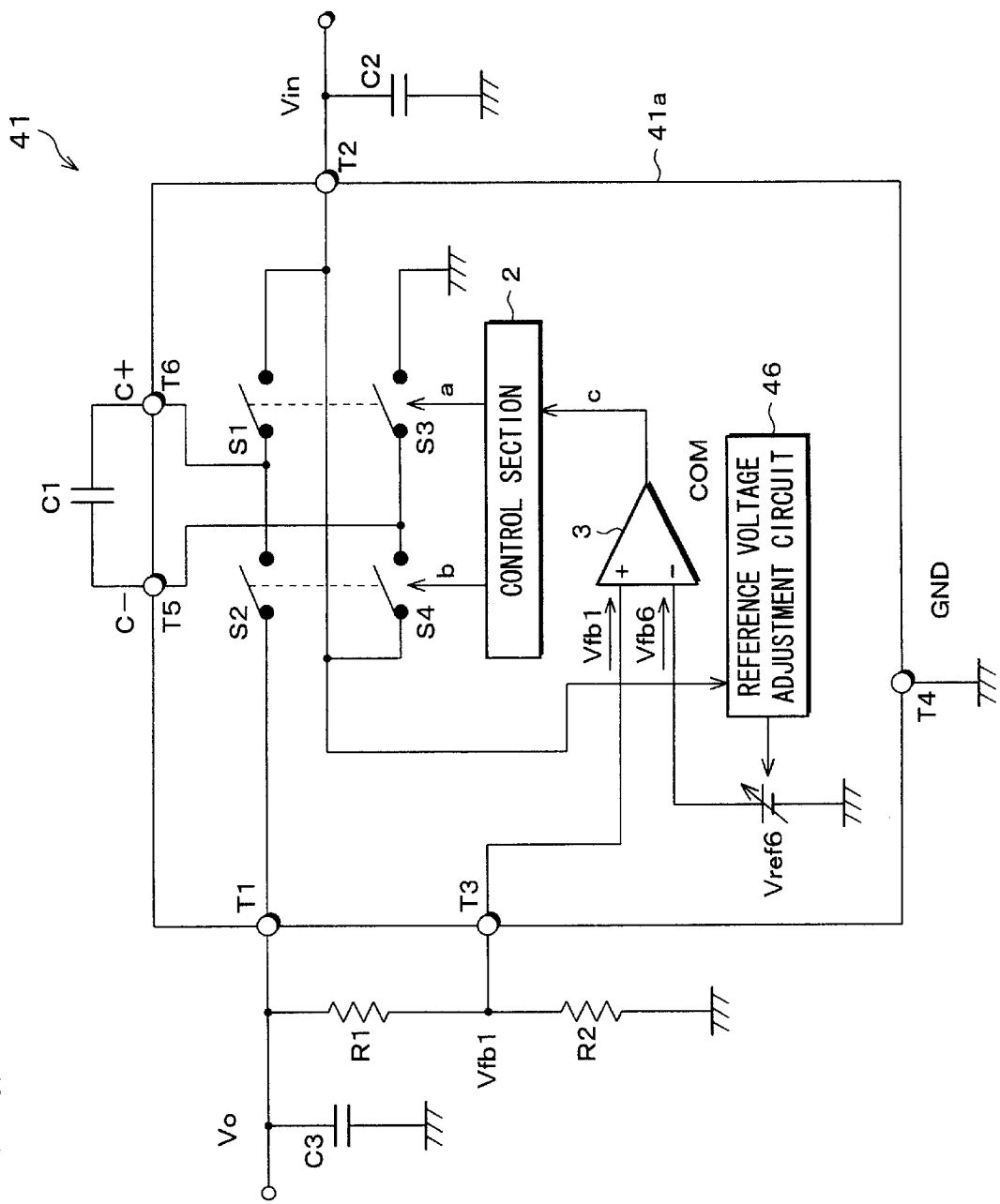
FIG. 16 is a circuit block diagram showing a more specific structure of the stabilized power unit shown in FIG. 1 in accordance with Example 4.

FIG. 16 shows a stabilized power unit 41 in which a reference voltage adjustment circuit 46 is provided as the soft start circuit 6 shown in FIG. 1. Along with this, the integrated portion 1a in FIG. 1 is illustrated in FIG. 16 as an integrated portion 41a. Besides, the direct voltage source 4 in FIG. 1 is deleted, and suppose that the reference voltage adjustment circuit 46 is a voltage source which operates using the input voltage $V_{in}$ as a source voltage, and generates a reference voltage $V_{ref}6$ so as to be voltage-adjustable and inputs the reference voltage $V_{ref}6$ to a reversal input terminal of the comparator 3. In other words, the reference voltage adjustment circuit 46 serves as a part of the switching section 5.

Upon start of the start-up of the stabilized power unit 41, the reference voltage adjustment circuit 46 increases the reference voltage $V_{ref}6$ to a predetermined value in steady state. The comparator 3 compares the feedback voltage $V_{fb}1$, which is the detected value of the output voltage $V_o$ detected by the voltage-dividing resistors R1 and R2, with the reference voltage $V_{ref}6$. When the feedback voltage $V_{fb}1$ reaches the reference voltage $V_{ref}6$ during the switching operation, the reference voltage adjustment circuit 46 outputs the signal c which gives an instruction to stop the switching operation in a condition that a charge from the voltage-increasing capacitor C1 to the output capacitor C3 is not carried out, to the control section 2. On the other hand, when the feedback voltage $V_{fb}1$ decreases by a predetermined value while the switching operation is stopped, the reference voltage adjustment circuit 46 outputs the signal c which gives an instruction to carry out the switching operation, to the control section 2.

In this manner, the voltage-dividing resistors R1 and R2 serve as output voltage detection means for detecting the output voltage $V_o$. Besides, the reference voltage adjustment circuit 46 also serves as reference voltage generation means for generating the reference voltage $V_{ref}6$ so as to be voltage-adjustable. Further, the comparator 3 serves as comparison means which compares the detected value of the output voltage $V_o$ detected by the voltage-dividing resistors R1 and R2 (the feedback voltage $V_{fb}1$) with the reference voltage $V_{ref}6$, and stops the switching operation in a condition that a charge from the voltage-increasing capacitor C1 to the output capacitor C3 is not carried out when the detected value becomes not less than the reference voltage $V_{ref}6$ during the switching operation, and makes the switching section 5 to carry out the switching operation when the detected value decreases by a predetermined value while the switching operation is stopped.

The reference voltage adjustment circuit 46 increases the reference voltage $V_{ref}6$ to a predetermined value so as to prevent a rush current from flowing into the voltage-increasing capacitor C1 at the start-up. With this structure, the output capacitor C3 is gradually charged in the voltage-increasing period. Therefore, this structure can easily prevent an overshoot of the output voltage $V_o$ at the start-up. Besides, since the structure by which the reference voltage adjustment circuit 46 increases the reference voltage $V_{ref}6$ can be designed very easily, complicated processes are not required and a chip area can be reduced when the structure is made up in a chip, and thus a soft start function can be attached inexpensively.

Figure 17:
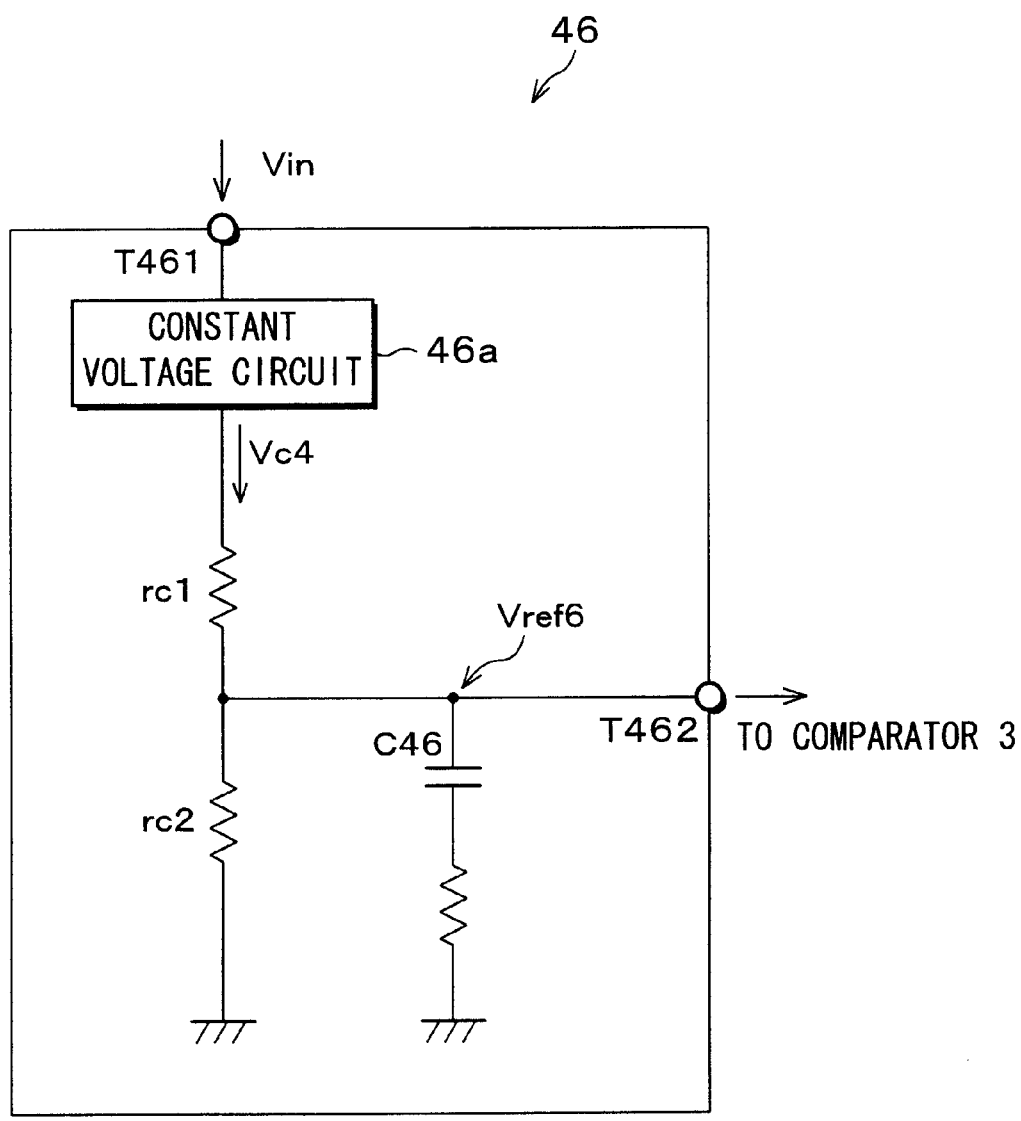
FIG. 17 is a circuit block diagram showing a structure of a reference voltage adjustment circuit of the stabilized power unit shown in FIG. 16.
Figure 18:
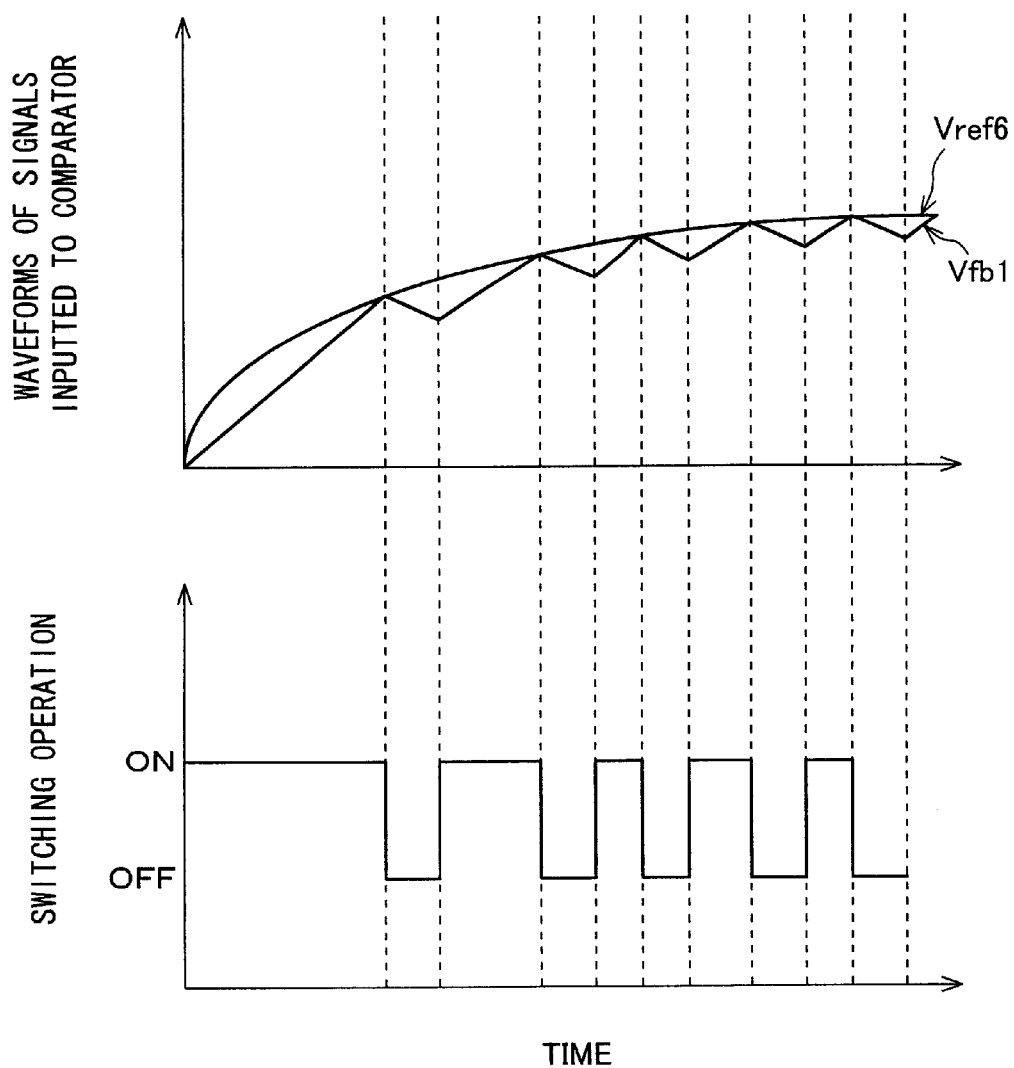
FIG. 18 is a time chart showing an operation of the stabilized power unit provided with the reference voltage adjustment circuit shown in FIG. 17.
Figure 19:
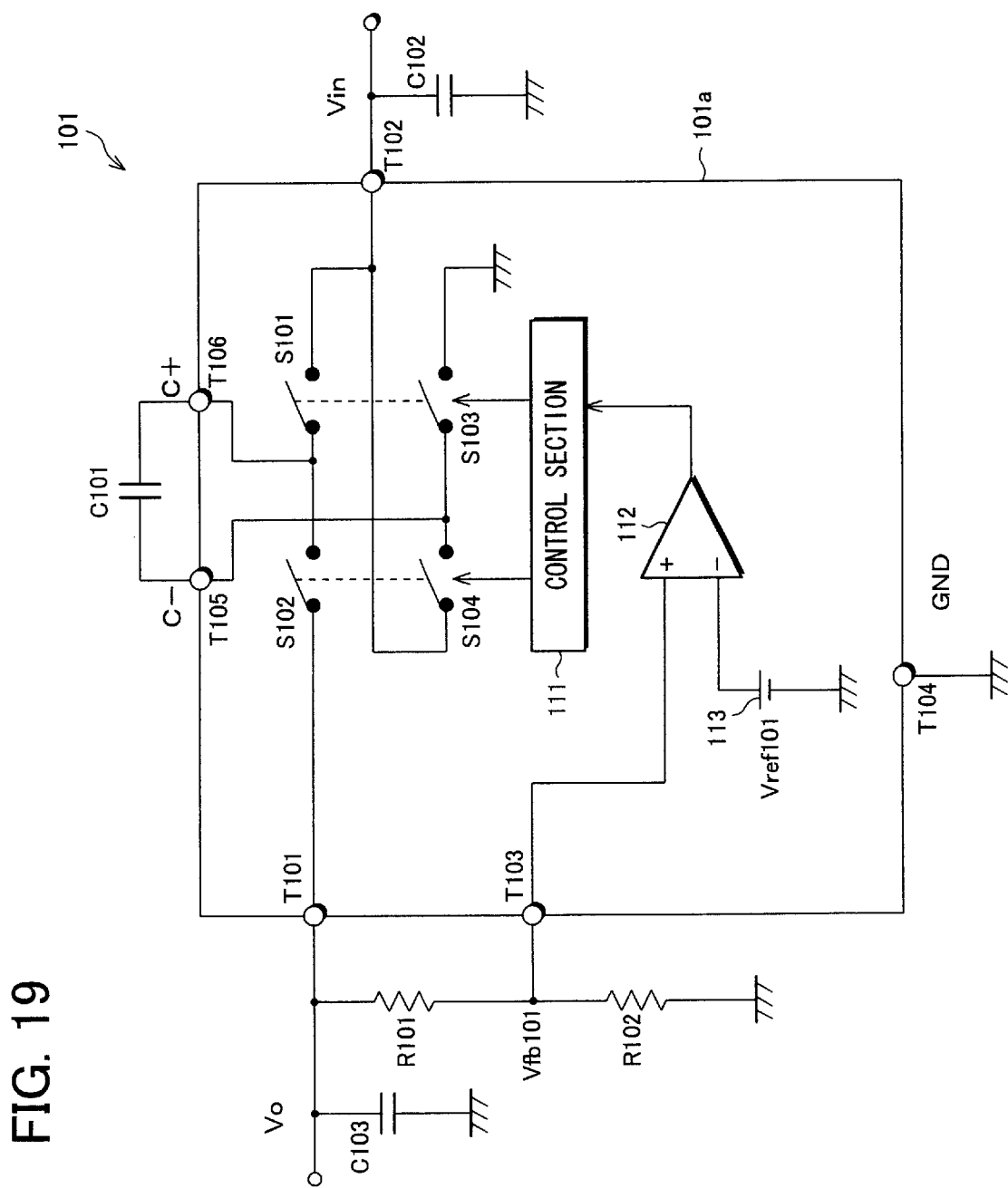
FIG. 19 is a circuit block diagram showing a structure of a conventional stabilized power unit.
Figure 20:
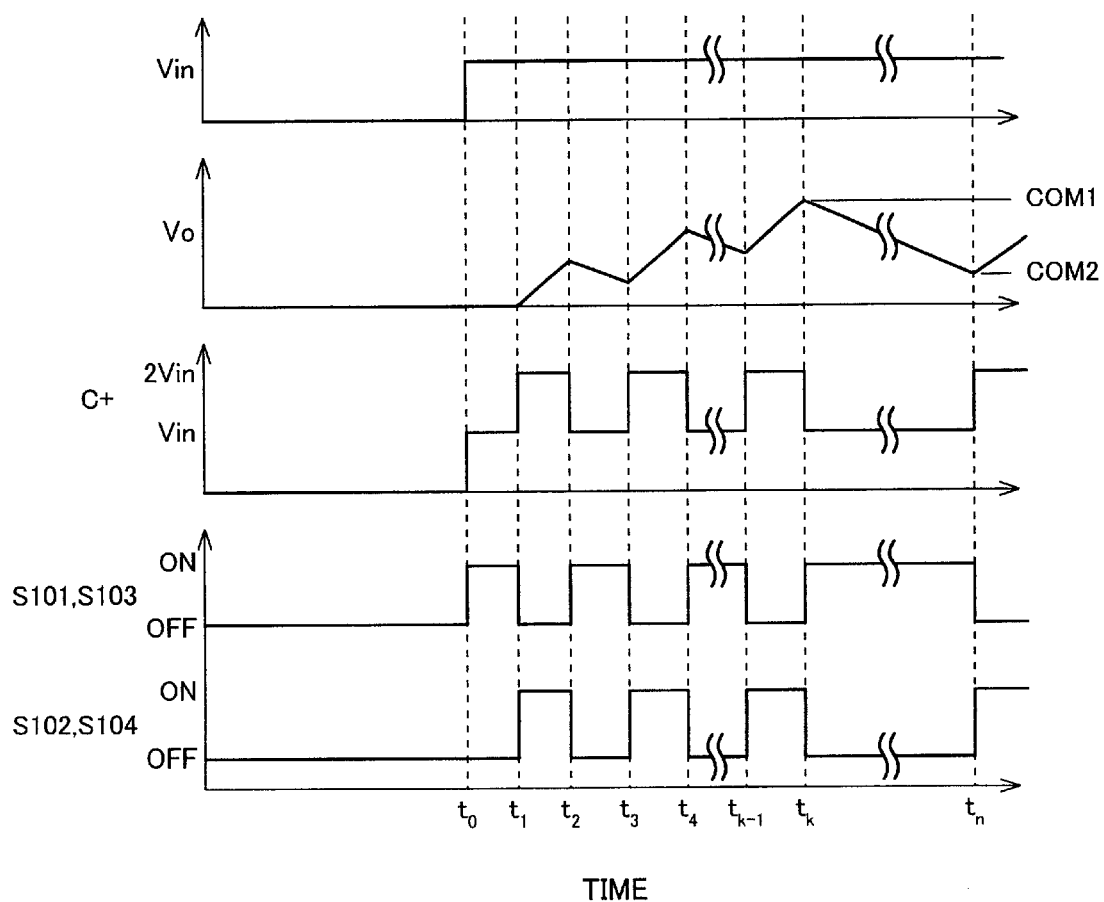
FIG. 20 is a time chart showing an operation of the stabilized power unit shown in FIG. 19.

Next, FIG. 17 shows a structure of the reference voltage adjustment circuit 46. The reference voltage adjustment circuit 46 is provided with a terminal T461 to which the input voltage $V_{in}$ is inputted via the input terminal T2, and a terminal T462 for outputting the reference voltage $V_{ref}6$, and includes a constant voltage circuit 46a, resistors rc1 and rc2, and a capacitor C46. The resistors rc1 and rc2 are connected in series between the constant voltage circuit 46a and a GND line, with the resistor rc2 provided on the side of a GND. The constant voltage circuit 46a is connected between the terminal T461 and an end of the resistor rc1 opposite to the point connected with the resistor rc2. The point connecting the resistors rc1 and rc2 is connected to the terminal T462, and the capacitor C46 is connected between the terminal T462 and a GND line.

Upon start of the start-up of the stabilized power unit 41, the constant voltage circuit 46a generates a constant voltage $V_c4$ from the input voltage $V_{in}$ for output. By the output of the voltage $V_c4$, a current flows into the resistors rc1 and rc2, and the capacitor C46 becomes charged. With this arrangement, a voltage between the terminals of the capacitor C46, determined according to element constants of the resistors rc1 and rc2 and the capacitor C46, is outputted from the terminal T462 as the reference voltage $V_{ref}6$, so as to be gradually increased as shown in a time chart in FIG. 18. When the feedback voltage $V_{fb}1$ is lower than the reference voltage $V_{ref}6$, the switching operation is continued (ON) and the feedback voltage $V_{fb}1$ is gradually increased, and when the feedback voltage $V_{fb}1$ reaches the reference voltage $V_{ref}6$, the switching operation is stopped (OFF). When the feedback voltage $V_{fb}1$ is declined by a predetermined voltage while the switching operation is stopped, the switching operation is started again, and the feedback voltage $V_{fb}1$ is approaching a value in steady state, with some up-and-down movements.

In this manner, the constant voltage circuit 46a and the resistors rc1 and rc2 constitute charge amount changing means for increasing or decreasing the charge amount of the capacitor C46 with time at the start-up. Since the reference voltage adjustment circuit 46 increases the reference voltage $V_{ref}6$ at the start-up based on the charge amount of the capacitor C46 increased or decreased with time, it becomes possible to easily prevent a rush current from flowing into the voltage-increasing capacitor C1. Besides, such a capacitor C46 of a desired type may be externally attached, and thus it becomes possible to freely set how to increase the reference voltage by the reference voltage adjustment circuit 46 at the start-up.

In such a manner, the switching operation is carried out by the reference voltage adjustment circuit 46 shown in FIG. 17 so as to prevent a rush current from flowing into the voltage-increasing capacitor C1 at the start-up, and the reference voltage adjustment circuit 46 controls the switching section 5 at the start-up to carry out the switching operation such that the charged voltage of the output capacitor C3 is always not more than the output voltage $V_o$ in steady state.

As described, a stabilized power unit of the present invention is a switched-capacitor-type stabilized power unit structured so as to include:

an voltage-increasing capacitor which is charged based on an input voltage and whose voltage is increased after being charged;

switching means for carrying out switching operation to alternately switch a charge period and a voltage-increasing period of the voltage-increasing capacitor; and an output capacitor which outputs a charged voltage obtained by being charged utilizing a voltage-increasing potential of the voltage-increasing capacitor in the voltage-increasing period, as an output voltage, and stabilizes the charged voltage within a range of the output voltage in steady state through a plurality of the voltage-increasing periods after a start-up is started, wherein the stabilized power unit includes soft start means for controlling the switching means to carry out the switching operation so that the charged voltage always becomes not more than the output voltage in the steady state, at the start-up from when the start-up is started until when the charged voltage is stabilized within the range of the output voltage in the steady state.

According to the foregoing invention, at the start-up, the soft start means controls the switching means to carry out the switching operation so that the charged voltage of the output capacitor always becomes not more than the output voltage in the steady state. With this structure, the charged voltage of the output capacitor becomes stabilized within the range of the output voltage in the steady state, without having an overshoot until the completion of the start-up. Consequently, it becomes possible to provide a switched-capacitor-type stabilized power unit which can prevent an overshoot of the output voltage at the start-up, in the structure having the output capacitor which outputs the charged voltage obtained through a plurality of charges by the switching operation utilizing a voltage-increasing potential of the voltage-increasing capacitor, as an output voltage.

The stabilized power unit of the present invention may be structured such that:

the soft start means controls the switching means so as to carry out the switching operation so that the charge period is gradually prolonged to a predetermined value, so as to prevent a rush current from flowing into the voltage-increasing capacitor at the start-up.

According to the foregoing invention, under the control of the soft start means, the switching means carries out the switching operation so that the charge period is gradually prolonged to the predetermined value at the start-up, and prevents a rush current from flowing into the voltage-increasing capacitor. Therefore, the output capacitor is gradually charged in the voltage-increasing period. Consequently, it becomes possible to easily prevent an overshoot of the output voltage at the start-up.

The stabilized power unit may be structured such that:

the soft start means includes a capacitor and charge amount changing means for increasing or decreasing a charge amount of the capacitor with time at the start-up; and the soft start means determines the charge period at the start-up based on the charge amount of the capacitor.

According to the foregoing invention, since the soft start means determines the charge period at the start-up based on the charge amount of the capacitor which is increased or decreased with time by the charge amount changing means, it becomes possible to easily prevent a rush current from flowing into the voltage-increasing capacitor at the start-up. Besides, since the capacitor of a desired type may be externally attached, it becomes possible to freely set how to change the charge period at the start-up.

Further, the stabilized power unit of the present invention may be structured such that:

the soft start means includes oscillation means for carrying out oscillation at a predetermined oscillation frequency and counting means for counting the number of oscillations of the oscillation means; and the soft start means detects a passage of time by counting the number of the oscillations by the counting means at the start-up, and determines the charge period based on a detection result of the passage of time.

According to the foregoing invention, since the soft start means detects the passage of time by counting the number of the oscillations of the oscillation means by the counting means at the start-up, and determines the charge period based on the detection result of the passage of time, it becomes possible to easily prevent a rush current from flowing into the voltage-increasing capacitor at the start-up.

Further, to achieve the foregoing object, the stabilized power unit may be structured such that:

the soft start means includes oscillation means for carrying out oscillation with an oscillation frequency changed from high to low with time at the start-up; and the soft start means determines the charge period at the start-up, based on the oscillation frequency.

According to the foregoing invention, the soft start means determines the charge period at the start up based on the oscillation frequency of the oscillation means for carrying out oscillation, the oscillation frequency being changed from high to low with time. Consequently, it becomes possible to easily prevent a rush current from flowing into the voltage-increasing capacitor at the start-up.

Further, to achieve the foregoing object, the stabilized power unit of the present invention may be structured such that:

the soft start means includes a capacitor and charge amount changing means for increasing or decreasing a charge amount of the capacitor with time at the start-up; and the soft start means changes the oscillation frequency at the start-up, based on the charge amount of the capacitor.

According to the foregoing invention, since the soft start means changes the oscillation frequency of the oscillation means at the start-up, based on the charge amount of the capacitor which is increased or decreased with time by the charge amount changing means, it becomes possible to easily prevent a rush current from flowing into the voltage-increasing capacitor at the start-up. Besides, since the capacitor of a desired type may be externally attached, it becomes possible to freely set how to change the oscillation frequency of the oscillation means at the start-up.

Further, to achieve the foregoing object, the stabilized power unit of the present invention may be structured such that:

the soft start means includes counting means for counting the number of oscillations of the oscillation means; and the soft start means detects a passage of time by counting the number of the oscillations by the counting means at the start-up, and changes the oscillation frequency based on a detection result of the passage of time.

According to the foregoing invention, since the soft start means detects the passage of time by counting the number of the oscillations by the counting means at the start-up, and changes the oscillation frequency of the oscillation means based on the detected passage of time, it becomes possible to easily prevent a rush current from flowing into the voltage-increasing capacitor at the start-up.

Further, to achieve the foregoing object, the stabilized power unit of the present invention may be structured such that:

the switching means includes not less than one first switch for connecting a path for charging the voltage-increasing capacitor in the charge period and for cutting off the path for charging the voltage-increasing capacitor in the voltage-increasing period, and not less than one second switch for cutting off a path for charging the output capacitor in the charge period and for connecting the path for charging the output capacitor in the voltage-increasing period;

at least one of the first switch and the second switch is a field-effect transistor; and the soft start means controls the switching means to carry out the switching operation so as to exercise channel resistance control for decreasing channel resistance with time when at least one field-effect transistor is conducting, so as to prevent a rush current from flowing into the output capacitor at the start-up.

According to the foregoing invention, under the control of the soft start means, the switching means carries out the switching operation at the start-up so as to exercise the channel resistance control for decreasing the channel resistance with time when at least one field-effect transistor of the first switch and the second switch is conducting, so as to prevent a rush current from flowing into the output capacitor. Therefore, the output capacitor is gradually charged at the start-up. Consequently, it becomes possible to easily prevent an overshoot of the output voltage at the start-up. Besides, since no rush current flows, the current rating of the field-effect transistor can be set lower.

Further, to achieve the foregoing object, the stabilized power unit of the present invention may be structured such that:

the soft start means includes a capacitor and charge amount changing means for increasing or decreasing a charge amount of the capacitor with time at the start-up; and the soft start means controls the switching means to carry out the switching operation so as to exercise the channel resistance control at the start-up, based on the charge amount of the capacitor.

According to the foregoing invention, the soft start means controls the switching means to decrease the channel resistance when the field-effect transistor is conducting at the start-up, based on the charge amount of the capacitor increased or decreased with time by the charge amount changing means. Therefore, it becomes possible to easily prevent a rush current from flowing into the output capacitor at the start-up. Besides, since the capacitor of a desired type may be externally attached, it becomes possible to freely set how to decrease the channel resistance of the field-effect transistor at the start-up.

Further, to achieve the foregoing object, the stabilized power unit of the present invention may be structured such that:

the stabilized power unit includes switching signal generation means for generating a switching signal constituted by a pulse corresponding to the switching operation;

the soft start means includes counting means for counting the number of pulses of the switching signal generated by the switching signal generation means; and the soft start means detects a passage of time by counting the number of the pulses by the counting means at the start-up, and controls the switching means to carry out the switching operation so as to exercise the channel resistance control, based on a detection result of the passage of time.

According to the foregoing invention, since the soft start means detects the passage of time by counting the number of the pulses of the switching signal generated by the switching signal generation means by the counting means at the start-up, and controls the switching means to decrease the channel resistance when the field-effect transistor is conducting, based on the detected passage of time, it becomes possible to easily prevent a rush current from flowing into the output capacitor at the start-up.

Further, to achieve the foregoing object, the stabilized power unit of the present invention may be structured such that:

the switching means includes (a) output voltage detection means for detecting the output voltage, (b) reference voltage generation means for generating a reference voltage so as to be voltage-adjustable, and (c) comparison means which compares a detected value of the output voltage detected by the output voltage detection means with the reference voltage, and controls the switching means to stop the switching operation in a condition that a charge from the voltage-increasing capacitor to the output capacitor is not carried out when the detected value becomes not less than the reference voltage during the switching operation, or controls the switching means to carry out the switching operation when the detected value decreases by a predetermined value while the switching operation is stopped; and the soft start means controls the reference voltage generation means to increase the reference voltage to a predetermined value so as to prevent a rush current from flowing into the voltage-increasing capacitor at the start-up.

According to the foregoing invention, the switching means may be structured so as to compare the detected value of the output voltage detected by the output voltage detection means with the reference voltage generated by the reference voltage generation means so as to be voltage-adjustable, by the comparison means. When the detected value is not less than the reference voltage during the switching operation, the comparison means controls the switching means to stop the switching operation so as not to carry out the charge from the voltage-increasing capacitor to the output capacitor, and when the detected value is declined by the predetermined value while the switching operation is stopped. On the other hand, the soft start means controls the reference voltage generation means to increase the reference voltage to a predetermined value so as to prevent a rush current from flowing into the voltage-increasing capacitor at the start-up. With this structure, the output capacitor is gradually charged in the voltage-increasing period. Consequently, it becomes possible to easily prevent an overshoot of the output voltage at the start-up.

Besides, since the structure by which the soft start means controls the reference voltage generation means to increase the reference voltage can be designed very easily, complicated processes are not required and a chip area can be reduced when the structure is made up in a chip, and thus a soft start function can be attached inexpensively.

Further, to achieve the foregoing object, the stabilized power unit of the present invention may be structured such that:

the soft start means includes a capacitor and charge amount changing means for increasing or decreasing a charge amount of the capacitor with time at the start-up; and the soft start means controls the reference voltage generation means to increase the reference voltage to the predetermined value at the start-up, based on the charge amount of the capacitor.

According to the foregoing invention, since the soft start means increases the reference voltage of the reference voltage generation means at the start up based on the charge amount of the capacitor increased or decreased with time by the charge amount changing means, it becomes possible to easily prevent a rush current from flowing into the output capacitor at the start-up. Besides, since the capacitor of a desired type may be externally attached, it becomes possible to freely set how to increase the reference voltage of the reference voltage generation means at the start-up.

The stabilized power unit of the present invention can be a stabilized power unit which includes:

an voltage-increasing capacitor which is charged based on an input voltage and whose voltage is increased after being charged;

switching means for carrying out switching operation to alternately switch a charge period and a voltage-increasing period of the voltage-increasing capacitor;

an output capacitor which outputs a charged voltage utilizing a voltage-increasing potential of the voltage-increasing capacitor in the voltage-increasing period, as an output voltage; and soft start means for controlling the switching means to carry out the switching operation which increases and decreases the output voltage within the range of the output voltage so that the charged voltage of the output capacitor is stabilized within the range of the output voltage in the steady state.

According to the foregoing invention, at the start-up, the soft start means controls the switching means to carry out the switching operation which increases and desreases the output voltage within the range of the output voltage so that the charged voltage of the output capacitor is stabilized within the range of the output voltage in the steady state. With this structure, the charged voltage of the output capacitor becomes stabilized within the range of the output voltage in the steady state, without having an overshoot until the completion of the start-up. Consequently, it becomes possible to provide a switched-capacitor-type stabilized power unit which can prevent an overshoot of the output voltage at the start-up, in the structure having the output capacitor which outputs the charged voltage obtained through a plurality of charges by the switching operation utilizing a voltage-increasing potential of the voltage-increasing capacitor, as an output voltage.

As the method for starting up the stabilized power unit of the present invention which includes:

switching means for carrying out switching operation to alternately switch a charge period and a voltage-increasing period of the voltage-increasing capacitor; and an output capacitor which outputs a charged voltage obtained by being charged utilizing a voltage-increasing potential of the voltage-increasing capacitor in the voltage-increasing period, as an output voltage, wherein:

the charged voltage is stabilized within a range of the output voltage in steady state through a plurality of the voltage-increasing periods after a start-up is started, the method includes the step of:

carrying out the switching operation so that the charged voltage always becomes not more than the output voltage in the steady state, at the start-up from when the start-up is started until when the charged voltage is stabilized within the range of the output voltage in the steady state.

According to the foregoing invention, at the start-up, the switching operation is carried out so that the charged voltage of the output capacitor always becomes not more than the output voltage in the steady state. With this structure, the charged voltage of the output capacitor becomes stabilized within the range of the output voltage in the steady state, without having an overshoot until the completion of the start-up. Consequently, it becomes possible to provide a switched-capacitor-type stabilized power unit which can prevent an overshoot of the output voltage at the start-up, in the structure having the output capacitor which outputs the charged voltage obtained through a plurality of charges by the switching operation utilizing a voltage-increasing potential of the voltage-increasing capacitor, as an output voltage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stabilized power unit, comprising:

an voltage-increasing capacitor which is charged based on an input voltage and whose voltage is increased after being charged;

switching means for carrying out switching operation to alternately switch a charge period and a voltage-increasing period of the voltage-increasing capacitor;

an output capacitor which outputs a charged voltage obtained by being charged utilizing a voltage-increasing potential of the voltage-increasing capacitor in the voltage-increasing period, as an output voltage, and stabilizes the charged voltage within a range of the output voltage in steady state through a plurality of the voltage-increasing periods after a start-up is started; and soft start means for controlling the switching means to carry out the switching operation so that the charged voltage always becomes not more than the output voltage in the steady state, at the start-up from when the start-up is started until when the charged voltage is stabilized within the range of the output voltage in the steady state.

2. A stabilized power unit, comprising:

an voltage-increasing capacitor which is charged based on an input voltage and whose voltage is increased after being charged;

switching means for carrying out switching operation to alternately switch a charge period and a voltage-increasing period of the voltage-increasing capacitor;

an output capacitor which outputs a charged voltage utilizing a voltage-increasing potential of the voltage-increasing capacitor in the voltage-increasing period, as an output voltage; and soft start means for controlling the switching means to carry out the switching operation which increases and desreases the output voltage within the range of the output voltage in the study state so that the charged voltage of the output capacitor is stabilized within the range of the output voltage in the steady state.

3. The stabilized power unit as set forth in claim 1, wherein:

the soft start means controls the switching means so as to carry out the switching operation so that the charge period is gradually prolonged to a predetermined value, so as to prevent a rush current from flowing into the voltage-increasing capacitor at the start-up.

4. The stabilized power unit as set forth in claim 3, wherein:

the soft start means includes a capacitor and charge amount changing means for increasing or decreasing a charge amount of the capacitor with time at the start-up; and the soft start means determines the charge period at the start-up based on the charge amount of the capacitor.

5. The stabilized power unit as set forth in claim 4, wherein:

the charge amount changing means includes a constant current source and a Zener diode, and Zener voltage of the Zener diode is set higher than a reference voltage of the soft start means.

6. The stabilized power unit as set forth in claim 3, wherein:

the soft start means includes oscillation means for carrying out oscillation at a predetermined oscillation frequency and counting means for counting the number of oscillations of the oscillation means; and the soft start means detects a passage of time by counting the number of the oscillations by the counting means at the start-up, and determines the charge period based on a detection result of the passage of time.

7. The stabilized power unit as set forth in claim 6, wherein:

the oscillation means carries out oscillation of a triangular wave voltage at a predetermined oscillation frequency, and the counting means (a) starts counting the number of oscillations of the triangular wave generated by the oscillation means at the start-up, and (b) outputs a signal for giving instruction which switch of plural switches in a switch circuit should be in a connected state when the number of the oscillations counted by the counting means reaches a predetermined value.

8. The stabilized power unit as set forth in claim 7, wherein:

the switch circuit makes a predetermined switch be in a connected state so as to obtain the lowest voltage; and the counting means switches the switches in the switch circuit for each threshold for the number of the oscillations generated by the oscillation means so as to increase the voltage step by step.

9. The stabilized power unit as set forth in claim 3, wherein:

the soft start means includes oscillation means for carrying out oscillation with an oscillation frequency changed from high to low with time at the start-up; and the soft start means determines the charge period at the start-up, based on the oscillation frequency.

10. The stabilized power unit as set forth in claim 9, wherein:

the soft start means includes a capacitor and charge amount changing means for increasing or decreasing a charge amount of the capacitor with time at the start-up; and the soft start means changes the oscillation frequency at the start-up, based on the charge amount of the capacitor.

11. The stabilized power unit as set forth in claim 10, wherein:

the charge amount changing means includes a constant current source and a Zener diode, and Zener voltage of the Zener diode is set higher than a reference voltage of the soft start means.

12. The stabilized power unit as set forth in claim 9, wherein:

the soft start means includes counting means for counting the number of oscillations of the oscillation means; and the soft start means detects a passage of time by counting the number of the oscillations by the counting means at the start-up, and changes the oscillation frequency based on a detection result of the passage of time.

13. The stabilized power unit as set forth in claim 12, wherein:

the oscillation means includes of an oscillator, and a clock counter circuit, and the clock counter circuit counts the number of oscillations of a triangular wave outputted from the oscillator, and is the clock counter circuit which outputs a signal for changing the oscillation frequency of the oscillator from a high frequency to a low frequency to the oscillator, whenever the count reaches a predetermined threshold.

14. The stabilized power unit as set forth in claim 1, wherein:

the switching means includes not less than one first switch for connecting a path for charging the voltage-increasing capacitor in the charge period and for cutting off the path for charging the voltage-increasing capacitor in the voltage-increasing period, and not less than one second switch for cutting off a path for charging the output capacitor in the charge period and for connecting the path for charging the output capacitor in the voltage-increasing period;

at least one of the first switch and the second switch is a field-effect transistor; and the soft start means controls the switching means to carry out the switching operation so as to exercise channel resistance control for decreasing channel resistance with time when at least one field-effect transistor is conducting, so as to prevent a rush current from flowing into the output capacitor at the start-up.

15. The stabilized power unit as set forth in claim 14, wherein:

at least one of the second switches is constituted by a field-effect transistor.

16. The stabilized power unit as set forth in claim 14, wherein:

the soft start means includes a capacitor and charge amount changing means for increasing or decreasing a charge amount of the capacitor with time at the start-up; and the soft start means controls the switching means to carry out the switching operation so as to exercise the channel resistance control at the start-up, based on the charge amount of the capacitor.

17. The stabilized power unit as set forth in claim 16, wherein:

the charge amount changing means includes resistors and a constant voltage circuit.

18. The stabilized power unit as set forth in claim 14, wherein:

the stabilized power unit includes switching signal generation means for generating a switching signal constituted by a pulse corresponding to the switching operation;

the soft start means includes counting means for counting the number of pulses of the switching signal generated by the switching signal generation means; and the soft start means detects a passage of time by counting the number of the pulses by the counting means at the start-up, and controls the switching means to carry out the switching operation so as to exercise the channel resistance control, based on a detection result of the passage of time.

19. The stabilized power unit as set forth in claim 1, wherein:

the switching means includes (a) output voltage detection means for detecting the output voltage, (b) reference voltage generation means for generating a reference voltage so as to be voltage-adjustable, and (c) comparison means which compares a detected value of the output voltage detected by the output voltage detection means with the reference voltage, and controls the switching means to stop the switching operation in a condition that a charge from the voltage-increasing capacitor to the output capacitor is not carried out when the detected value becomes not less than the reference voltage during the switching operation, or controls the switching means to carry out the switching operation when the detected value decreases by a predetermined value while the switching operation is stopped; and the soft start means controls the reference voltage generation means to increase the reference voltage to a predetermined value so as to prevent a rush current from flowing into the voltage-increasing capacitor at the start-up.

20. The stabilized power unit as set forth in claim 19, wherein:

the stabilized power unit has a chip structure.

21. The stabilized power unit as set forth in claim 19, wherein:

the soft start means includes a capacitor and charge amount changing means for increasing or decreasing a charge amount of the capacitor with time at the start-up; and the soft start means controls the reference voltage generation means to increase the reference voltage to the predetermined value at the start-up, based on the charge amount of the capacitor.

22. The stabilized power unit as set forth in claim 21, wherein:

the charge amount changing means is made up of resistors and a constant voltage circuit.

23. A method for starting up a stabilized power unit which includes:

an voltage-increasing capacitor which is charged based on an input voltage and whose voltage is increased after being charged;

switching means for carrying out switching operation to alternately switch a charge period and a voltage-increasing period of the voltage-increasing capacitor; and an output capacitor which outputs a charged voltage obtained by being charged utilizing a voltage-increasing potential of the voltage-increasing capacitor in the voltage-increasing period, as an output voltage, wherein:

the charged voltage is stabilized within a range of the output voltage in steady state through a plurality of the voltage-increasing periods after a start-up is started, said method comprising the step of:

carrying out the switching operation so that the charged voltage always becomes not more than the output voltage in the steady state, at the start-up from when the start-up is started until when the charged voltage is stabilized within the range of the output voltage in the steady state.

* * * * *